US009306965B1

(12) United States Patent
Grossman et al.

(10) Patent No.: US 9,306,965 B1
(45) Date of Patent: Apr. 5, 2016

(54) CYBERSECURITY SYSTEM

(71) Applicant: IronNet Cybersecurity, Inc., Fulton, MD (US)

(72) Inventors: Robert L. Grossman, River Forest, IL (US); James E. Heath, Sugar Loaf Key, FL (US); Russell D. Richardson, McLean, VA (US); Keith B. Alexander, Fulton, MD (US)

(73) Assignee: IronNet Cybersecurity, Inc., Fulton, MD (US)

( * ) Notice: Subject to any disclaimer, the term of this patent is extended or adjusted under 35 U.S.C. 154(b) by 0 days.

(21) Appl. No.: 14/885,857

(22) Filed: Oct. 16, 2015

Related U.S. Application Data

(60) Provisional application No. 62/066,769, filed on Oct. 21, 2014.

(51) Int. Cl.
*H04L 29/06* (2006.01)

(52) U.S. Cl.
CPC ........ *H04L 63/1416* (2013.01); *H04L 63/1441* (2013.01)

(58) Field of Classification Search
CPC .................................................. H04L 63/1416
See application file for complete search history.

(56) References Cited

U.S. PATENT DOCUMENTS

| 6,088,804 | A | 7/2000 | Hill et al. |
| 6,134,664 | A | 10/2000 | Walker |
| 6,279,113 | B1 | 8/2001 | Vaidya |
| 6,484,203 | B1 | 11/2002 | Porras et al. |
| 6,519,703 | B1 | 2/2003 | Joyce |
| 6,597,660 | B1 | 7/2003 | Rueda et al. |
| 6,671,811 | B1 | 12/2003 | Diep et al. |
| 6,769,066 | B1 | 7/2004 | Botros et al. |
| 7,290,283 | B2 | 10/2007 | Copeland, III |
| 7,331,061 | B1 | 2/2008 | Ramsey et al. |
| 7,346,803 | B2 | 3/2008 | Ide et al. |
| 7,386,883 | B2 | 6/2008 | Bardsley et al. |

(Continued)

OTHER PUBLICATIONS

Denning, Dorothy E., "An Intrusion-Detection Model," IEEE Transactions on Software Engineering, vol. SE-13, No. 2, pp. 222-232 (Feb. 1987).

(Continued)

*Primary Examiner* — Amir Mehrmanesh
*Assistant Examiner* — Khang Do
(74) *Attorney, Agent, or Firm* — Wilmer Cutler Pickering Hale and Dorr LLP

(57) ABSTRACT

A cybersecurity system for processing events to produce scores, alerts, and mitigation actions. The system includes sensors for receiving and processing data to form events, distributed analytic platform for processing events to form analytic workflows, and scoring engines for processing events using analytic workflows to produce scoring engine messages. The system also includes real time analytic engine for processing scoring engine messages and distributed analytic platform messages using the analytic workflows and analytic workflow and event processing rules to form and transmit a threat intelligence message. Threat intelligence messages include broadcast messages, mitigation messages, and model update messages. The system also includes logical segments which associate an analytic model, a set of analytic models, or an analytic workflow; one or more sources of inputs about activity within the logical segment, and a set of actions for mitigating an impact of the anomalous activity occurring within the logical segment.

29 Claims, 11 Drawing Sheets

(56) References Cited

U.S. PATENT DOCUMENTS

| | | | |
|---|---|---|---|
| 7,406,606 | B2 | 7/2008 | Chawla et al. |
| 7,454,792 | B2 | 11/2008 | Cantrell et al. |
| 7,458,094 | B2 | 11/2008 | Jackson |
| 7,571,478 | B2 | 8/2009 | Munson et al. |
| 7,594,260 | B2 | 9/2009 | Porras et al. |
| 7,603,711 | B2 | 10/2009 | Scheidell |
| 7,694,115 | B1 | 4/2010 | Porras et al. |
| 7,739,082 | B2 | 6/2010 | Scherrer |
| 7,770,203 | B2 | 8/2010 | McKenna |
| 7,809,740 | B2 | 10/2010 | Chung et al. |
| 7,814,548 | B2 | 10/2010 | Mukhopadhyay et al. |
| 7,840,377 | B2 | 11/2010 | Ramsey et al. |
| 7,934,254 | B2 | 4/2011 | Graham |
| 8,056,130 | B1 | 11/2011 | Njemanze et al. |
| 8,079,080 | B2 | 12/2011 | Borders |
| 8,135,830 | B2 | 3/2012 | McClure et al. |
| 8,185,955 | B2 | 5/2012 | Cangini et al. |
| 8,205,259 | B2 | 6/2012 | Stute |
| 8,296,850 | B2 | 10/2012 | Srinivasa et al. |
| 8,326,987 | B2 | 12/2012 | Lin |
| 8,392,997 | B2 | 3/2013 | Chen et al. |
| 8,424,091 | B1 | 4/2013 | Su et al. |
| 8,443,443 | B2 | 5/2013 | Nordstrom et al. |
| 8,458,793 | B2 | 6/2013 | McKenna |
| 8,473,415 | B2 | 6/2013 | Siegel et al. |
| 8,527,776 | B2 | 9/2013 | Botros et al. |
| 8,528,091 | B2 | 9/2013 | Bowen et al. |
| 8,620,028 | B2 | 12/2013 | Eaton et al. |
| 8,631,464 | B2 | 1/2014 | Belakhdar et al. |
| 8,640,234 | B2 | 1/2014 | Gassen et al. |
| 8,707,431 | B2 | 4/2014 | Stephens et al. |
| 8,769,684 | B2 | 7/2014 | Stolfo et al. |
| 8,863,279 | B2 | 10/2014 | McDougal et al. |
| 8,887,281 | B2 | 11/2014 | Honig et al. |
| 8,887,286 | B2 | 11/2014 | Dupont et al. |
| 8,898,784 | B1 | 11/2014 | Alexander et al. |
| 8,973,140 | B2 | 3/2015 | Shnowske et al. |
| 8,989,880 | B2 | 3/2015 | Wohl et al. |
| 9,032,521 | B2 | 5/2015 | Amini et al. |
| 9,038,180 | B2 | 5/2015 | Neil |
| 9,043,587 | B1 | 5/2015 | Chen et al. |
| 9,049,224 | B2 | 6/2015 | Lin |
| 2006/0191010 | A1 | 8/2006 | Benjamin |
| 2007/0204345 | A1 | 8/2007 | Pereira et al. |
| 2007/0245420 | A1 | 10/2007 | Yong et al. |
| 2009/0024549 | A1 | 1/2009 | Johnson |
| 2009/0083855 | A1* | 3/2009 | Apap .................... G06F 21/552 726/24 |
| 2012/0137367 | A1* | 5/2012 | Dupont .................. G06F 21/00 726/25 |
| 2013/0031633 | A1* | 1/2013 | Honig ................... G06F 21/554 726/23 |
| 2015/0026061 | A1 | 1/2015 | Siegel et al. |

OTHER PUBLICATIONS

Ghosh, A. K. et al., "Detecting Anomalous and Unknown Intrusions Against Programs," Reliable Software Technologies, 9 pages (No date listed).

Ghosh, A. K. et al., "Learning Program Behavior Profiles for Intrusion Detection," USENIX The Advanced Computing Systems Association, Proceedings of the Workshop on Intrusion Detection and Network Monitoring, Santa Clara, California, 13 pages (Apr. 9-12, 1999).

GitHub, "Update spec to version 0.5—datamininggroup/pfa@8502e36," GitHub, retrieved online URL: <https://github.com/datamininggroup/pfa/commit/8502e36ccd60f133e91d89b84ca9df8ffd0e88d1>, pp. 1-7 (retrieved online Nov. 2, 2015).

Heard, N. A. et al., "Bayesian Anomaly Detection Methods for Social Networks," The Annals of Applied Statistics, vol. 4, No. 2, pp. 645-662 (2010).

Neumann, P. G. and Porras, P. A., "Experience with EMERALD to Date," USENIX The Advanced Computing Systems Association, Proceedings of the Workshop on Intrusion Detection and Network Monitoring, Santa Clara, California, 9 pages (Apr. 9-12, 1999).

Patcha, A. and Park, J.-M., "An overview of anomaly detection techniques: Existing solutions and latest technological trends," Computer Networks, vol. 51, pp. 3448-3470 (2007).

Ryan, J. et al., "Intrusion Detection with Neural Networks," AAAI Technical Report, WS-97-07, pp. 72-77 (1997).

Smith, Rasheda, "Network-Based Intrusion Detection Using Neural Networks," Department of Computer Science, 18 pages (No date listed).

Wagner, D. and Dean, D., "Intrusion detection via Static Analysis," IEEE Symposium on Security and Privacy, Oakland, California, pp. 156-168 (May 14-16, 2001).

Xie, P. et al., "Using Bayesian Networks for Cyber Security Analysis," Conference Paper, 10 pages (Sep. 2010).

Zanero, S. and Savaresi, S. M., "Unsupervised learning techniques for an intrusion detection system," Proceedings of the 2004 ACM Symposium on Applied Computing, New York, New York, pp. 8 pages (2004).

* cited by examiner

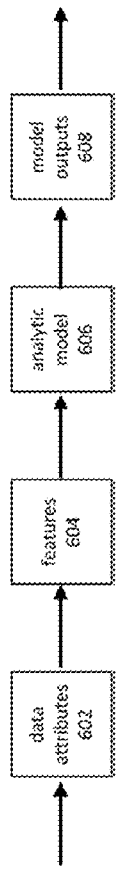
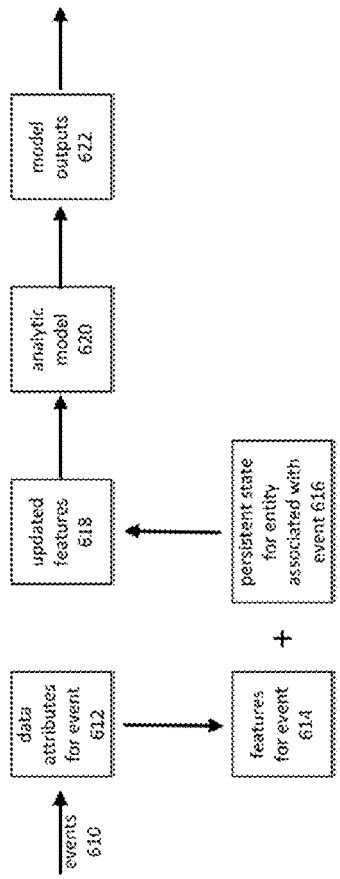
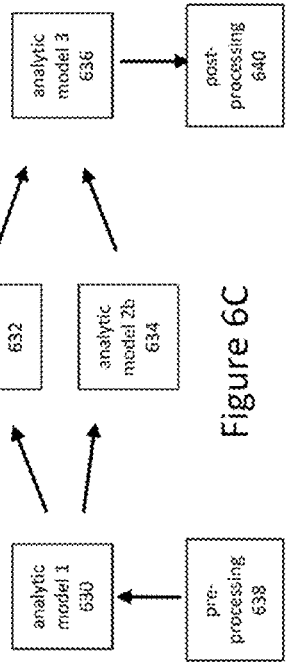
Figure 6A
Figure 6B
Figure 6C

CYBERSECURITY SYSTEM

CROSS REFERENCE TO RELATED APPLICATIONS

This application claims priority under 35 U.S.C. 119(e) to U.S. Provisional Application No. 62/066,769, filed Oct. 21, 2014, entitled, "Cybersecurity System," the contents of which are incorporated herein in their entirety.

BACKGROUND

Traditionally, cybersecurity systems are limited in their ability to account for device differences in large networks and to perform real time processing. In a large network, there will be many devices and their behaviors will be quite different. The conventional approach is to develop a single behavior model for the network or for each type of device in the network (workstation, server, switch, router, etc. in the network). The problem with this approach is that this type of approach does not capture the differences between individual devices. Another limitation of traditional cybersecurity systems is that conventional behavioral models are built manually after enough data has been accumulated, investigated with exploratory data analysis and analyzed. Traditional systems often require: a person to manually build models, previous state information about entities of interest, and distributed/batch analytics that can process the data in multiple passes and require distributed or disk based data. As such, real time data is not leveraged efficiently, if at all.

SUMMARY

Although certain techniques for predictive modeling are known, the approach described herein can be used to integrate a segmented analytic modeling with a type of data center micro-segmentation that enables the system to take the appropriate mitigation event for each micro-segment. In other words, according to some embodiments, a large enterprise network is first divided up into a large number of homogenous data center micro-segments based on the behavior of the entities in the micro-segments, the users that interact with the entities, and the packets and flows in the micro-segments. In particular, large numbers of segments are created in the enterprise in which sensors are placed that can collect data for one or more such segments. Models are then built for each segment, and each segment is monitored with a sensor and a scoring engine, and mitigation actions that are appropriate are taken for that particular micro segment. In other words, the use of event-based modeling and multiple models are integrated with real time scoring engines, and data center micro-segmentation, which allows for effective application of appropriate mitigation events for each micro-segment.

Although separating the building of analytic models (a special case of which are behavioral models) and the scoring of analytic models using two different applications is a standard technique in the monitoring of real time systems and the generation of alerts, the use of multiple sensors and multiple scoring engines that communicate over a high performance ESB; the ability to update a model interchange format (MIF) model, such as Portable Format for Analytics (PFA), using a message sent over the ESB; the collection of evidence event by event from multiple scoring engines, each communicating using a threat intelligence message (TIM) to a real time analytic engine (RTAE) over the ESB; and the processing of these TIMs by the RTAE in order to send out appropriate mitigation events (mitigation TIMs) over the ESB are each individually significant advances over the use of a single scoring engine processing a single stream of data that can only replace a model interchange format document with a new one.

In accordance with the disclosed subject matter, systems, methods, and non-transitory computer-readable media are provided for providing a cybersecurity system for processing events to produce scores, alerts, and mitigation actions.

In some embodiments, the disclosed subject matter includes a cybersecurity system for processing events to produce scores, alerts, and mitigation actions. In some embodiments, the system includes a plurality of sensors, each of the plurality of sensors being configured to receive sensor data from the network, process the sensor data to form events, and transmit the events. In some embodiments, the system includes a distributed analytic platform, the distributed analytic platform configured to receive the events from the plurality of sensors, process the events to form analytic workflows, each of the analytic workflows associated with one or more logical segments, and transmit the analytic workflows and distributed analytic platform messages. In some embodiments, the system includes a plurality of scoring engines, each of the plurality of scoring engines being configured to receive the analytic workflows from the distributed analytic platform, receive the events from at least one of the plurality of sensors, process the received events using the analytic workflows to produce scoring engine messages, and transmit the scoring engine messages. In some embodiments, the system includes a real time analytic engine, the real time analytic engine configured to receive the analytic workflows from the distributed analytic platform, receive analytic workflow and event processing rules, receive the scoring engine messages from the plurality of scoring engines, receive the distributed analytic platform messages from the distributed analytic platform, and process the scoring engine messages and the distributed analytic platform messages using the analytic workflows from the distributed analytic platform and the analytic workflow and event processing rules to form a threat intelligence message. In some embodiments, the threat intelligence message comprises at least one of a broadcast message, the real time analytic engine configured to transmit the broadcast message, a mitigation message, the real time analytic engine configured to transmit the mitigation message to a control plane engine for taking a mitigation action associated with a first logical segment of the one or more logical segments when the processing by the real time analytic engine indicates the mitigation action limits the impact of anomalous activity, and a model update message, the real time analytic engine configured to transmit the model update message for updating one or more analytic workflows when the processing by the real time analytic engine indicates the model update message improves at least one of a detection rate of the anomalous activity and a reduction in a false positive rate. In some embodiments, each of the one or more logical segments associates an analytic model, a set of analytic models, or an analytic workflow; one or more sources of inputs about activity within the logical segment; and a set of actions for mitigating an impact of the anomalous activity occurring within the logical segment.

In some embodiments, the plurality of sensors, the plurality of scoring engines, the distributed analytic platform, the real time analytic engine, and the control plane engine are connected using an out of band network.

In some embodiments, the plurality of sensors, the plurality of scoring engines, the distributed analytic platform, the real time analytic engine, and the control plane engine communicate by sending associated messages over an enterprise system bus.

In some embodiments, the plurality of sensors, the plurality of scoring engines, the distributed analytic platform, the real time analytic engine, and the control plane engine are connected using an out of band network and communicate by sending associated messages over an enterprise system bus.

In some embodiments, the system described herein further comprises an ingest actors module, the ingest actors module configured to receive third party application data from at least one of a third party application and a third party device, and transmit the third party application data for further processing by at least one of the plurality of scoring engines, the distributed analytic platform and the real time analytic engine.

In some embodiments, the plurality of sensors, the plurality of scoring engines, the distributed analytic platform, the real time analytic engine, the control plane engine, and the ingest actors module are connected using an out of band network.

In some embodiments, the plurality of sensors, the plurality of scoring engines, the distributed analytic platform, the real time analytic engine, the control plane engine, and the ingest actors module communicate by sending associated messages over an enterprise system bus.

In some embodiments, the scoring engine is further configured to receive the model update messages, and process the update messages concurrently with the processing of the events.

In some embodiments, to form at least one of the broadcast message, the mitigation message and the model update message, the real time analytic engine is further configured to receive a first output at a first time from at least one of the plurality of scoring engines, the distributed analytic platform, and the plurality of sensors; retrieve first state information corresponding to the first output; update the first state information with first output data; process the updated first state information by an analytic workflow associated with the real time analytic engine to form processed updated first state information; store the processed updated first state information in the real time analytic engine; receive a second output at a second time from at least one of the plurality of scoring engines, the distributed analytic platform, and the plurality of sensors; retrieve second state information corresponding to the second output; update the second state information with second output data; process the updated second state information by the analytic workflow associated with the real time analytic engine to form processed updated second state information; form the at least one of the broadcast message, the mitigation message and the model update message based on the processed updated second state information; and store the processed updated second state information in the real time analytic engine.

In some embodiments, the real time analytic engine is further configured to receive an interim output at a third time from at least one of the plurality of scoring engines, the distributed analytic platform, and the plurality of sensors, wherein the third time is subsequent to the first time and prior to the second time; retrieve interim state information corresponding to the interim output; update the interim state information with interim output data; process the updated interim state information by the analytic workflow associated with the real time analytic engine to form processed updated interim state information; and store the processed updated interim state information in the real time analytic engine.

In some embodiments, the analytic workflows comprise a Model Interchange Format document, wherein the Model Interchange Format document supports a composition of analytic models; a segmentation of analytic models; an ensemble of analytic models; a composition of analytic models with rules; a composition of analytic models with pre-processing and post-processing stages, wherein the preprocessing and post-processing stages includes data transformations and data aggregations; and the analytic workflows, each of the analytic workflows comprising at least one of analytic models, rules, data transformations, data aggregations, and compositions of the analytic models, the rules, the data transformations, the data aggregations, the segmentations, and the ensembles.

In some embodiments, the real time analytic engine is further configured to transmit an updated behavioral model to one or more of the plurality of scoring engines when changes to one or more of the analytic workflows exceeds a threshold.

In some embodiments, the events comprise at least one of data about network flows, data about packets, data about entities, data about users, data about workstations and servers, data about routers and switches, data about external network entities, and data about internal and external devices interacting with the network.

In some embodiments, one or more of the plurality of sensors and the plurality of scoring engines are integrated into a single application.

In some embodiments, the real time analytic engine is integrated with one or more of the plurality of scoring engines.

In some embodiments, the mitigation action comprises at least one of: closing at least one port, modifying of at least one packet data, controlling the transmission of packets or flows, blocking a subnet, blocking one or more Internet Protocols (IPs) or ranges of IPs, and blocking one or more internal or external IPs.

In some embodiments, the mitigation action comprises at least one of: taking at least one of a server and workstation offline, creating at least one of a new virtualized server and new virtualized workstation from a protected image, and blocking an action associated with at least one of the server and the workstation.

In some embodiments, the anomalous activity comprises at least one of a reconnaissance, exploit, intrusion, compromise, insider threat, and attack.

In some embodiments, the mitigation action comprises at least one of modifying of at least one packet data, controlling the transmission of packets or flows, and removing authorization and access privileges for an entity associated with the anomalous activity, wherein removing authorization and access privileges comprises at least one of blocking network access, blocking access to network devices, blocking access to servers, blocking access to workstations, and blocking access to other computing devices.

In some embodiments, the anomalous activity is associated with at least one of an internal bad actor and an external bad actor.

In some embodiments, the system further comprises a visualization engine, the visualization engine including a monitor, the visualization engine configured to receive statistics and graphical images associated with the processing of scoring engine messages by the real time analytic engine; and display the statistics and graphical images on the monitor.

In some embodiments, a cybersecurity network is disclosed that includes a plurality of the cybersecurity systems described herein, wherein each of the plurality of cybersecurity systems is configured to exchange a selected threat intelligence message with one or more of the other cybersecurity systems, wherein the selected threat intelligence message is encrypted to provide a secure mechanism for transferring information, wherein the information in the selected threat intelligence message does not expose sensitive internal information about the transmitting cybersecurity system.

In some embodiments, the cybersecurity system is further configured to exchange an external threat intelligence message with a compatible third party system, wherein the external threat intelligence message is encrypted to provide a secure mechanism for transferring information, the information in the external threat intelligence message does not expose sensitive internal information about the system transmitting the external threat intelligence message, and the external threat intelligence message is formatted with a common Model Interchange Format.

In some embodiments, the distributed analytic platform is further configured to receive the scoring engine messages, and process the scoring engine messages to form threat intelligence messages.

In some embodiments, the broadcast message comprises at least one of an information message, a cyber event message and an alert message.

In some embodiments, each of the plurality of logical segments is associated with at least one of a division of the network, a division of the traffic on the network, a division of users on the network, a division of devices on the network, a division based upon third party data, and data associated with at least one of the divisions of the network, the traffic on the network, the users on the network, the devices on the network and third party data.

In some embodiments, at least a first division overlaps with at least a second division.

In some embodiments, at least a first division overlaps with at least a second division and the plurality of sensors, the plurality of scoring engines, the distributed analytic platform, the real time analytic engine, the control plane engine, and the ingest actors module communicate by sending associated messages over an enterprise system bus.

In some embodiments, the disclosed subject matter includes a cybersecurity system for processing events to produce scores, alerts, and mitigation actions. In some embodiments, the system includes a plurality of sensors, each of the plurality of sensors being configured to receive sensor data from the network, process the sensor data to form events, and transmit the events. In some embodiments, the system includes a distributed analytic platform, the distributed analytic platform configured to receive the events from the plurality of sensors, process the events to form analytic workflows, each of the analytic workflows associated with one or more logical segments, and transmit the analytic workflows and distributed analytic platform messages. In some embodiments, the system includes a scoring engine, the scoring engine configured to receive the analytic workflows from the distributed analytic platform, receive the events from at least one of the plurality of sensors, process the events using the analytic workflows to produce scoring engine messages, and transmit the scoring engine messages. In some embodiments, the system includes a real time analytic engine, the real time analytic engine configured to receive the analytic workflows from the distributed analytic platform, receive analytic workflow and event processing rules, receive the scoring engine messages from the plurality of scoring engines, receive the distributed analytic platform messages from the distributed analytic platform, and process the scoring engine messages and the distributed analytic platform messages using the analytic workflows from the distributed analytic platform and the analytic workflow and event processing rules to form a threat intelligence message. In some embodiments, the threat intelligence message comprises at least one of a broadcast message, the real time analytic engine configured to transmit the broadcast message, a mitigation message, the real time analytic engine configured to transmit the mitigation message to a control plane engine for taking a mitigation action associated with a first logical segment of the one or more logical segments when the processing by the real time analytic engine indicates the mitigation action limits the impact of anomalous activity, and a model update message, the real time analytic engine configured to transmit the model update message for updating one or more analytic workflows when the processing by the real time analytic engine indicates the model update message improves at least one of a detection rate of the anomalous activity and a reduction in a false positive rate. In some embodiments, each of the one or more logical segments associates an analytic model, a set of analytic models, or an analytic workflow; one or more sources of inputs about activity within the logical segment; and a set of actions for mitigating an impact of the anomalous activity occurring within the logical segment.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6A is a flow chart showing processing of inputs or events directly, according to some embodiments of the present invention.

FIG. 6B is a flow chart showing associating one or more persistent states with each event, according to some embodiments of the present disclosure.

FIG. 6C is a flow chart illustrating pre-processing and post-processing of an analytic model, according to some embodiments of the present disclosure.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Some embodiments of the present disclosure relate to creating a cybersecurity framework. The cybersecurity framework performs detection and mitigation actions in near real-time across a distributed enterprise, while simplifying monitoring, analytics and deployment.

The processes described herein in some embodiments use the out of band ESB and the out of band network, which permit processing the large amount of network flow data, files of packets (PCAP) data, system log data, external threat data, and other data of interest by the distributed analytic platform; near real time scoring; near real time processing of threat intelligence messages (TIMs), mitigation events, and model updates by the various components of the system; and near real time analytic visualization, monitoring, and updates to dashboards.

Representative actions in the cyber environment include: the analysis of cyber analytic data, building behavioral models, behavioral model scoring, updating behavioral models, sending alerts, assessing alerts, sending command, control and mitigation actions, real time visualization, and operating a collaboration framework.

System Architecture

Figure 1:
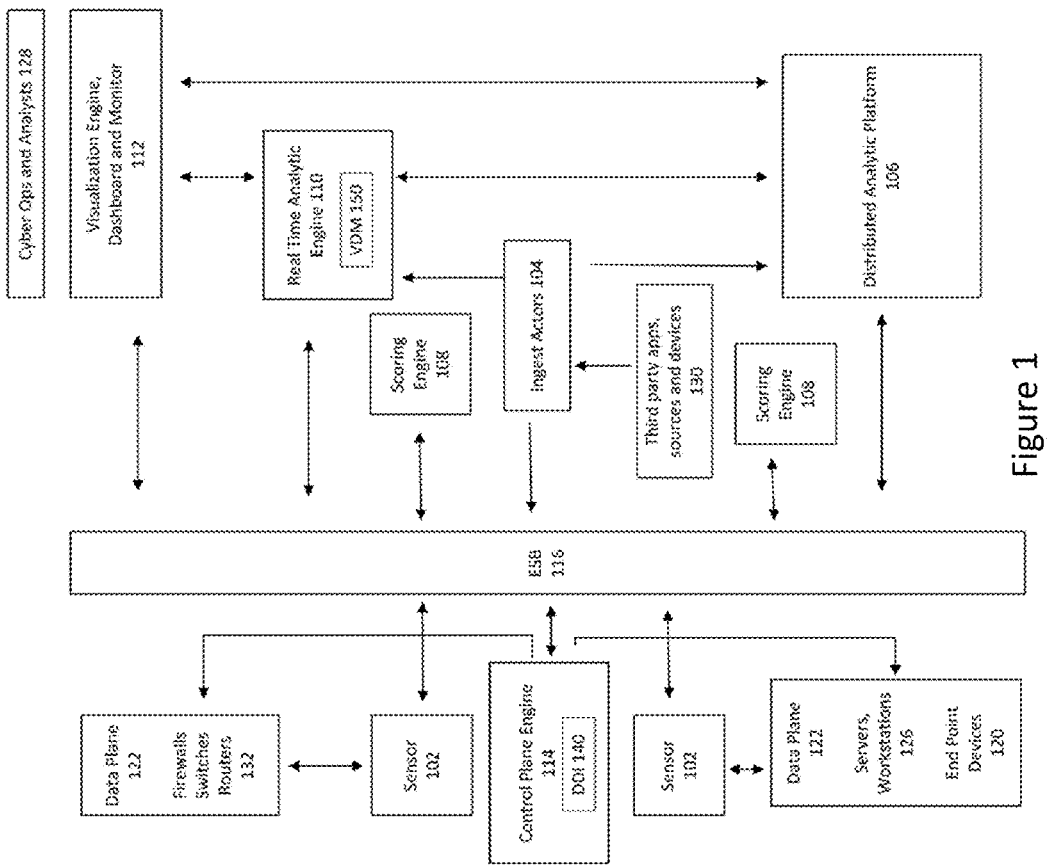
FIG. 1 is a system diagram showing a cybersecurity framework, according to some embodiments of the present disclosure.

FIG. 1 is a system diagram showing a cybersecurity framework, according to some embodiments of the present disclosure. FIG. 1 shows sensor 102 (also referred to herein as cyber sensor), ingest actors 104, distributed analytic platform 106, scoring engine 108, real time analytic engine (RTAE) 110, visualization engine 112, control plane engine 114, and distributed enterprise service bus (ESB) 116. In some embodiments of the present disclosure, sensor 102 and scoring engine 108 are combined into a single integrated application. FIG. 1 also shows additional system components, including end points 120, data plane 122, servers and workstations 126, cyber operations (ops) staff and cyber analysts 128, third party applications, third party applications, sources and devices 130, and firewalls, switches, and routers 132.

Each of the elements in FIG. 1 are described in more detail below. Briefly, sensor 102 captures and processes data from the enterprise data plane 122 and passes the data to ESB 116, where the data is routed for further processing. Data plane 122 transmits data to and from the various devices on the enterprise network including from end point devices 120, servers and workstations 126, and firewalls, switches, and routers 132. Control plane engine 114 receives processed data from ESB 116 and monitors, configures and re-configures network devices, including switches, routers and firewalls 132. Scoring engine 108 receives data from ESB 116 and for each event in the stream, processes the event using one or more analytic models, to produce outputs, including scores, alerts and messages, as well as related information. Ingest actors 104 capture and process data from third party applications, sources and devices, and send the data to ESB 116, where the data is routed for further processing. Distributed analytic platform 106 (which can also be referred to as an analytic cloud) is a distributed computing platform that can be used for analyzing large amounts of data and producing various analytic results. Distributed analytic platform 106 receives and sends data to and from ESB 116, ingest actors 104, RTAE 110, and visualization engine 112. RTAE 110 receives data from ESB 116 and the distributed analytic platform 106 and performs near real time computations using distributed memory and specialized processors, such as GPUs, creates near real time visualizations, and creates near real time decisions about mitigation actions by processing data from multiple scoring engines 108 and other sources. Visualization engine, dashboard and monitor 112 receives and sends data to and from ESB 116, RTAE 110 and analytic platform 106, and provides cyber ops and analysts 128 a visual representation of the other elements described in FIG. 1. Visualization engine, dashboard and monitor 112 can provide user configurable dashboards, provide real time information and support for real time queries from RTAE 110, provide and visualize the results of analysis using the distributed analytic platform 106, and provide interactive ability to query for entities, alerts, events, PCAP data, flow data, graphs.

Figure 2:
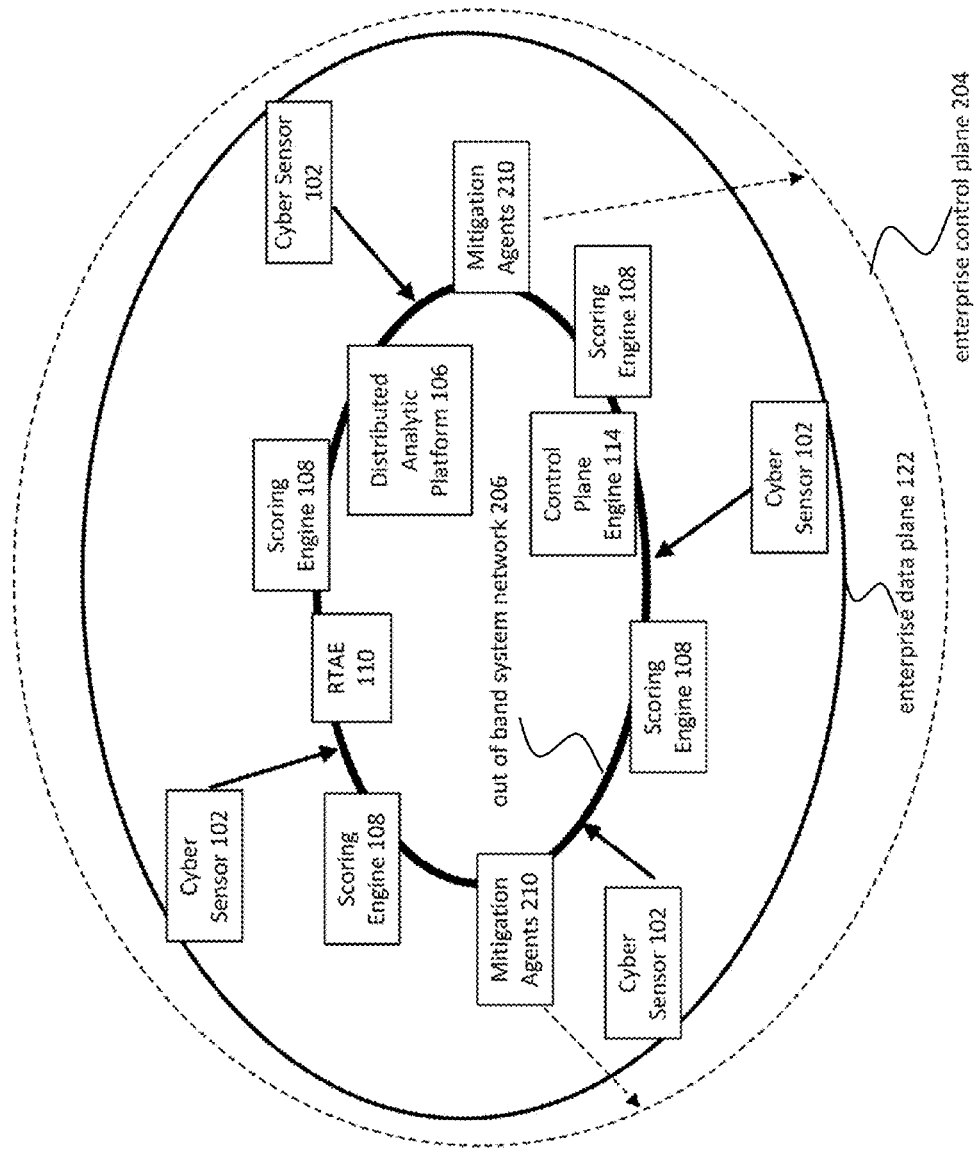
FIG. 2 is a system diagram showing a cybersecurity framework implemented over three networks, according to some embodiments of the present disclosure.

As FIG. 2 shows, in some embodiments of the present disclosure, a cybersecurity framework can be implemented over three networks. FIG. 2 shows an enterprise data plane 122, an enterprise control plane 204, and an out of band system network 206. In some embodiments of the present disclosure, an enterprise service bus 116 is deployed over the out of band system network. The out of band system network 206 connects cyber sensor 102, distributed analytic platform 106, RTAE 110, scoring engine 108, control plane engine 114, and mitigation agents 210. In some embodiments, two or more of the following components communicate with other components in the out of band network through ESB 116: cyber sensor 102, distributed analytic platform 106, RTAE 110, scoring engine 108, control plane engine 114, and mitigation agents 210.

In some embodiments, control plane engine 114 can send mitigation messages to mitigation agents 210 through the enterprise control plane 204. Mitigation agents 210 can be embedded in the control plane engine 114, or may be embedded or integrated with other components of the system or with other devices or components of the enterprise. For example, a mitigation agent 210 may be integrated with the control plane engine 114 and send messages to the enterprise control plane to close ports or block IPs. Mitigation agents 210 send a mitigation action to the control plane, which then takes an action, such as modifying tables in a router or switch. Mitigation actions include modifications that result in closing a port, isolating an end device, server, or network service, isolating a subnet, etc. Another example is that a mitigation agent 210 may send a mitigation action to a network device on the enterprise data plane that modifies packets or changes the transmission of packets or flows.

In some embodiments, sensors 102 (also referred to herein as cyber sensors) are positioned on the enterprise data plane 122. As described in more detail below, sensors 102 collect and process network data on the enterprise data plane 122 to send the processed data to the out of band system network 206. In some embodiments, cyber sensor 102 can be connected directly to scoring engine 108 (e.g., without being connected through an ESB 116) or integrated with the scoring engine 108.

As shown in FIG. 2, an enterprise network functions as the data plane 122 and carries the bulk of the data that passes over the networks in the enterprise. In addition, some enterprises may use a control plane 204 for communicating control information to switches, routers, firewalls 132, and other network devices. The control 204 and data plane 122 are logically separate and may or may not share the same physical network. In some embodiments of the present disclosure, there is also an out of band system network 206 that the system components use for communication. In this disclosure, out of band refers to a separate physical network from the enterprise data plane 122 and control plane 204.

In some embodiments of the present disclosure, the out of band system network 206 has higher capacity than the enterprise data plane 122. For example, if the enterprise data plane is a 10G network, then the out of band system network may be a 40G network. If the enterprise data plane is a 40G network, then the out of band system network is a 100G network.

In some embodiments, the components described above in FIG. 1 are located within the same network. For example, in some embodiments, enterprise plane 122 and control plane 204 are in the same network as distributed analytic platform 106, scoring engine 108, real time analytic engine (RTAE) 110, visualization engine 112, and control plane engine 114.

In some embodiments of the present disclosure, the cybersecurity system described herein, for example in FIG. 1, can be deployed in a plurality of physical or logical locations. Each of the deployed cybersecurity systems can be configured to exchange selected threat intelligence messages with one or more of the cybersecurity systems. In some embodiments, selected threat intelligence messages are encrypted to provide a secure mechanism for transferring information. In some embodiments, the transferred information in the selected threat intelligence message does not expose sensitive internal information about the transmitting cybersecurity system, such as specific internal devices compromised or specific internal IPs under attack, but instead contains information about types of attacks, external IPs, etc.

In some embodiments of the present disclosure, the cybersecurity system described herein can be configured to exchange an external threat intelligence message with a compatible third party system. The external threat intelligence message can be encrypted to provide a secure mechanism for transferring information. In some embodiments, the information in the external threat intelligence message does not expose sensitive internal information about third parties, such as specific internal devices compromised or specific internal IPs under attack, but instead contains information about types of attacks, external IPs, etc. The external threat intelligence message can be formatted with a common Model Interchange Format for behavioral models that is understood by the scoring engines, distributed analytic platform, and real time analytic engine.

FIGS. 1 and 2, taken together, are described in more detail below.

Enterprise Service Bus 116, Messages and Topics.

In some embodiments of the present disclosure, the out of band system network uses a distributed enterprise service bus (ESB) 116 for communication. A distributed ESB 116 is language and platform agnostic and can include any enterprise service bus including, but not limited to AMQP, NSQ, ZeroMQ, RabitMQ, Adeptia ESB Suite, IBM WebSphere ESB, Microsoft BizTalk Server, and Oracle Enterprise Service Bus. An ESB 116 delivers messages reliably and, in most embodiments, has a very high throughput. Generally, an enterprise service bus monitors, routes and resolves communication from a variety of devices. Devices can include end points 120 and data plane 122. End points include end user devices 120 such as workstation servers, personal computers and mobile devices such as cell phones and tablets. The data plane 122 includes devices that carry network traffic such as firewalls, switches, and routers 132. In addition, control plane traffic to firewall, switches, routers 132 and other devices that are part of the control plane is also passed to the out of band system network.

In some embodiments, messages on ESB 116 are usually divided into separate streams, often called topics, each with their own queues, so that the messages related to one topic do not interfere with messages related to another topic. The present disclosure in exemplary implementation uses topics to create separate queues in the ESB 116 so that different types of events processed by the scoring engines, messages passed to different system components, different types of TIMs, etc. all have different queues.

Data is passed to the out of band system network for processing, analysis, and visualization in two main ways: via sensors 102 and via ingest actors 104. Sensors 102 and ingest actors 104 are discussed in more detail below. The processing and analysis of data results in the creation of further records and (threat intelligence messages) TIMs, which are passed to the out of band ESB, and the creation of real time visualizations and various reports, all of which are described in more detail below.

Sensors 102.

One way that data enters the system is via sensors. Sensors 102 capture and process data from the enterprise data plane 122 and enterprise control plane 204 and pass the data to the out of band system network for further processing. Network taps, which are part of sensor 102, are inserted at key points for network visibility and mirroring of network traffic to support real-time processes. Sensor 102 is described in more detail below in the description accompanying FIGS. 7 and 9. Briefly, sensor 102 processes packets and builds records and flows associated with the processed packets.

In some embodiments, there are at least three ports: an incoming data port an outgoing data port, and a monitor port. Either all, or selected data determined by the sensor, is mirrored on the monitor port. The data on the monitor port is processed to produce records that are passed to the out of band ESB 116 as described below. In some embodiments of the system, there is also a fourth port that provides command and control information to the sensor and tap. The fourth port can be used to change which data is being collected and processed, as well as to take certain mitigation actions, such as not passing through to the outgoing port certain packets. For example, packets associated with a particular IP, port, extracted data, or computed feature can be blocked.

Figure 3:
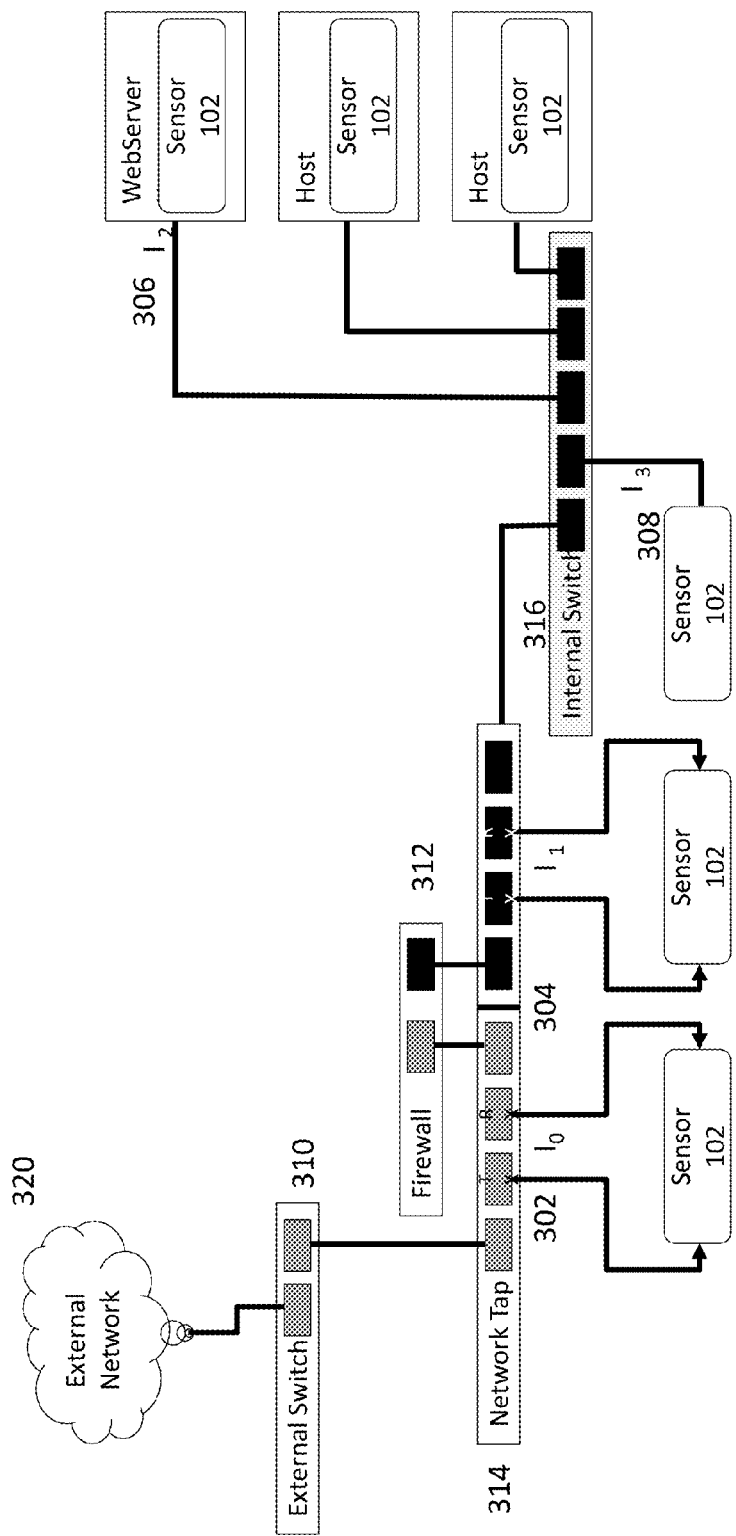
FIG. 3 is a system diagram showing network taps inserted at different parts of an enterprise network, according to some embodiments of the present disclosure.

FIG. 3 is a system diagram showing network taps inserted at different parts of an enterprise network, according to some embodiments of the present disclosure. $I_O$ 302 is a network tap 314 that is at the enterprise gateway between the enterprise network and the external Internet 320. $I_O$ 302 is the visibility point on network tap 314 prior to firewall 312 and can be positioned on an external switch 310. $I_O$ 302 is the external facing interface of the customer infrastructure, and represents the first opportunity to use statistical and analytical models, and other techniques to detect probing, intrusions, network reconnaissance, attacks on the enterprise, and other behavior by bad actors; to begin the process of attribution (e.g., identifying the actor behind the threatening behavior); and to develop appropriate responses to stop or to limit the impact of the behavior. Traditionally, the $I_0$ 302 interface is the boundary between the outside and the inside of the information infrastructure. Normally this is the outward facing interface of an entire enterprise, but for these purposes, $I_0$ 302 can refer to the exterior boundary interface, or the outward facing interface of any information infrastructure; enterprise, container, cloud or workgroup. $I_0$ 302 is the point where customers generally implement their first stage protection, usually using a router Access Control List (ACL) or a commercial firewall solution. Normally these devices are enforcing a conservative (mostly restrictive) access control policy, and represent the principal protection point for the infrastructure. For many sites, the $I_0$ 302 interface is also a Network Address Translation (NAT) point, which modifies packet addresses to minimize the exposure of infrastructure identifiers to external entities. Types of bad actor behavior seen at $I_0$ include:

1) Remote attempts to discover and penetrate external defenses;
2) External, but local, strategies to penetrate exterior infrastructure;
3) Insider mediated external access control modifications;
4) Internal facilitated external access;
5) Traditional cyber exploitation; and
6) Infrastructure rootkit based exploitation.

$I_1$ 304 and $I_2$ 306 are internal facing interfaces within the enterprise and anomalous cyber activity within the enterprise is referred to herein as an internal attack. $I_1$ 304 is a network tap 314 that is positioned between the enterprise firewall 312 and the rest of the internal enterprise networks. Sensor appliance $I_2$ 306 enables visibility into lateral network traffic within the enterprise. $I_2$ network taps 306 are positioned on internal switches 316 and can see traffic to devices, such as webservers, enterprise servers, workstations, desktops, and other such devices. $I_3$ 308 is a network device that can process data on the enterprise control plane. In general, in many deployments of the system, except for the simplest networks, there will be multiple sensors of types $I_2$ 306 and $I_3$ 308. For some complex networks there may be multiples sensors of types $I_0$ 302 and $I_1$ 304.

In some embodiments, data and activity from $I_0$ 302, $I_1$ 304, $I_2$ 306 and $I_3$ 308 are continuously correlated and scored to command and control all enterprise networks and components through control plane interface. Sensor 102 in conjunction with the scoring engine 108 and behavior models and RTAE 110 produce TIMs, including TIM mitigation and TIM model update messages that are passed along the ESB 116 and consumed by enterprise and network components to support real time command and control actions. Examples of mitigation TIMs and model update TIMs that are used in some embodiments of the present disclosure are described below. Briefly, an example of a mitigation TIM in some embodiments of the present disclosure is a message to close a particular port or isolate a particular device. An example of a model update TIM in some embodiments of the present disclosure is lowering a threshold of an alert in a post-processing element of a behavioral model workflow based upon behavior in the enterprise network. In more detail, the scoring engine 108 parses a model update TIM, to identify the appropriate component of the PFA document to update, such as the value of the threshold in the appropriate PFA element in this example, and replaces the current value of the threshold with the new value of the threshold supplied in the model update TIM. Another example of a model update TIM in some embodiments of the present disclosure is changing a coefficient in an analytic model or a coefficient in the pre- or post-processing PFA components of an analytic model.

Ingest Actors 104.

A second way that data enters the system is via ingest actors 104. Ingest actors 104 can be designed to process data from third party applications (apps), sources and devices 130. Third party applications (apps), sources and devices 130 can include other system components; log files produced by workstations, servers, network devices, and other computing devices on the enterprise networks; information streams produced by other security applications, including host based security systems; external third party sources of data, including information about threats, reputations of IPs, response policy zone (RPZ) information and related information; other systems with the same architecture, either at other geographically distributed locations of the same enterprise, or associated with other enterprises; and other systems with a different architecture but following an agreed upon format for exchanging information.

Ingest actors 104 receive input data to process from one of the sources described above or directly from the ESB 116. After processing, ingest actors 104 delivers the processed event back to the ESB 116 for additional processing by other system components. Ingest actors 104 receives input data to process from third party applications (apps), sources and devices 130, and performs data processing and the conversions required so that input data can be transmitted to the ESB 116, RTAE 110 or distributed analytic platform 106 for further processing. In some embodiments, processing at ingest actors 104 involves taking input data and converting the input data into a format suitable of ingestion by ESB 116, RTAE 110, or distributed analytic platform 106.

Scoring Engine 108.

A scoring engine 108 is a module that can import an analytic model (or an analytic workflow) and takes data from the network and from other system modules. Once an analytic model is imported, a scoring engine can read a stream of data and for each event in the stream, process the event using one or more analytic models, to produce outputs, including scores, alerts and messages, as well as related information. The scoring engine 108 and data flows associated with the scoring engine 108 are described in more detail below in the description accompanying FIGS. 7, 9 and 4.

As described above, scoring engine 108 is a module that can score data with statistical and behavioral models at network speeds. Models can be built offline from historical data or from streaming data. In some embodiments, scoring engine 108 can emit scoring engine messages, such as alerts, containing metadata data and scores. In some embodiments, scoring engine is PFA-compliant, as described in more detail below. Scoring engine 108 can score data using statistical, predictive, and data mining models such as a cluster model, baseline model, Bayesian network or a regression and classification tree. Models can be built offline based on historical data. Models can also be streaming analytic models, as discussed in more detail below.

Figure 4:
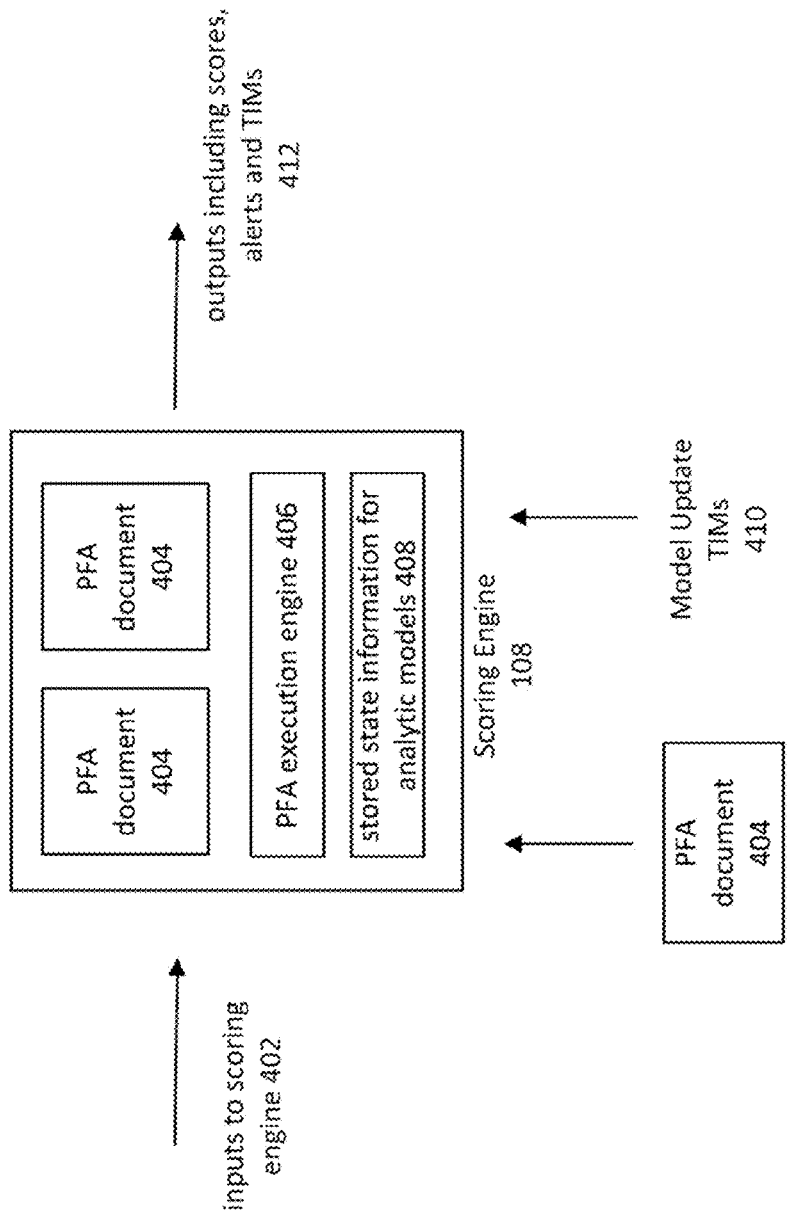
FIG. 4 is a block diagram showing a scoring engine in accordance with some embodiments of the present disclosure.

FIG. 4 is a block diagram showing a scoring engine in accordance with some embodiments of the present disclosure. FIG. 4 shows inputs to scoring engine 402, PFA document 404, PFA execution engine 406, stored state information for analytic models 408, model update TIMs 410 and outputs 412. The inputs to the scoring engine 402 can be a stream of events, or more generally, data records. The scoring engine 108 processes the inputs 402 using the PFA execution engine

406. PFA is a language that describes how inputs for analytics are transformed and aggregated to produce analytic outputs. The PFA execution engine takes inputs to the scoring engine and produces outputs following the processes and procedures (also referred to herein as the analytic workflows) in the PFA document 404. For example, a PFA document 404 can describe a classification and regression tree; the PFA execution engine 406 takes inputs to the classification and regression trees and produces outputs of the classification and regression tree. The scoring engine 108 contains stored state information for entities and updates this state information as specified in the PFA document 404. In some embodiments, to update the analytic processing, the scoring engine 108 imports a new PFA document 404.

In some embodiments of the present disclosure, the analytic processing in the scoring engine 108 can also be updated by sending one or more model update TIMs to the scoring engine 108, which updates the appropriate components of the PFA documents, as specified by the model update TIM. As described above, the update can include a change to a threshold value or to a coefficient of an algorithm that is part of an analytic model. This type of update, which is referred to herein as a small update, can be applied by a scoring engine to a stream of data mid-stream without stopping the processing of data by the scoring engine. Larger updates are also possible, such as switching out an entire PFA document 404.

More generally, a scoring engine 108 in some embodiments of the present disclosure can be based on other Model Interchange Formats. An exemplary Model Interchange Format is based upon a specification that allows for updating of model information concurrent with the scoring of data records by the model, such as provided by read-copy-update policy supported by cells and pools in the PFA specification. The read-copy-update policy allows the PFA document 404 to be read by the scoring engine concurrent with the updating of some components of the document. Near real time scoring, as described in some embodiments herein, is related to supporting concurrent scoring of data using models with concurrent updating of models. More generally, an exemplary Model Interchange Format for the present disclosure is based upon a specification for describing analytic models and analytic processing of data by transformations and aggregations that supports passing the outputs of analytic models, transformations and aggregations to the inputs of other analytic models, transformations and aggregations.

Distributed Analytic Platform 106.

Distributed analytic platform 106 or analytic cloud is a distributed computing platform that can be used for analyzing large amounts of data and producing various analytic results. Distributed analytic platform 106 can hold large amounts of data for analysis, both using a distributed file system, such as Hadoop or MapR, or using a non-relational (e.g., NoSQL) database, such as HBase, Accumulo, MapR-DB, etc. In some embodiments of the present disclosure, the distributed analytic platform 106 is a distributed computing platform that includes support for MapReduce and iterative MapReduce computations, such as those supported by Spark. The distributed analytic platform 106 in some embodiments of the present disclosure, also includes support for performing iterative computations with data either on disk, in memory, or both on disk and in memory, as well as support for NoSQL databases and other specialized applications and tools for working with distributed data in a systems such as Hadoop, MapR, Spark, or other distributed computing platform. Distributed analytic platform 106 also includes a REST-based API so that the various system components can access data and information in the distributed analytic platform 106 in a uniform way, independent of the particular analytic, process or component within the distributed analytic platform that produced the data or information.

The distributed analytic platform 106 receives data from sensors 102 and ingest actors 104 via the distributed ESB 116. In some embodiments of the present disclosure, the distributed analytic platform 106 also receives data directly from ingest actors 104.

There are several types of outputs from the distributed analytic platform 106, including: threat intelligence messages (TIMs) that are sent to the ESB 116, and from the ESB 116 to the control plane engine 114; data and data structures describing visualizations of the data that are sent to the RTAE 110 (as described in more detail below), and from the RTAE 110 to the visualization engine, dashboard and monitor 112; analytic workflows, including analytic models, described in portable format for analytics (PFA) (as described in more detail below), as well as other languages that can be used for describing analytic models for scoring engine 108.

The distributed analytic platform 106 collects, cleans, integrates and builds behavioral models from large collections of flow data (e.g., network flow streams and data files), packet data (e.g., PCAP files), and log files from network devices, servers, and other devices. The environment is designed for machine based learning algorithms that may take minutes to hours or longer to run. The outputs are analytic workflows, which can include behavioral models, and distributed analytic platform TIMs (also referred to herein as analytic platform messages). In some embodiments, the analytic workflow contains many segmented models, each associated with a logical segment. In some embodiments, the analytic workflow contains many segmented workflows, each associated with a logical segment. In some embodiments, this environment is designed for data scientists and support discoveries of new threats and the production of analytic models for the other environments.

The distributed analytic platform 106 may also include a virtual machine infrastructure that can include virtual machines for containment of potential malware. Malware can be executed in a virtual machine, which is isolated from the cybersecurity framework. In some embodiments, the virtual machines include Linux containers.

Real Time Analytic Engine 110.

RTAE 110 receives data from ESB 116 and the distributed analytic platform 106 and performs several functions, including performing near real time computations of derived, aggregated, and transformed data using distributed memory and specialized processors, such as GPUs; creating near real time visualizations of network activity, behavior of enterprise entities, users, and flows, potential threats, correlated behaviors, etc.; and creating near real time decisions about mitigation actions by processing data from multiple scoring engines and other sources. Some examples of creating near real time decisions about mitigation actions are discussed in the description accompanying FIGS. 10 and 11. In some embodiments, data received from the distributed analytic platform 106 include analytic workflows and distributed analytic messages. In some embodiments, RTAE 110 also receives scoring engine messages from the scoring engine and analytic workflow and event processing rules from at least one of distributed analytic platform, user configured settings, and results of third party analytic systems. The near real time visualizations are passed to the visualization engine, dashboard and monitor 112 for display. In some embodiments, the near real time decisions about mitigation events are structured into command and control (C2) messages (e.g., mitigation TIMs), passed to the ESB 116, which they are processed by the control plane engine 114, which in turn takes various mitigation events or actions, such as closing a port, modifying packets, blocking a subnet, blocking one or more Internet Protocols (IPs) or ranges of IPs, blocking one or more internal or external IPs, controlling the transmission of packets or flows, taking at least one of a server and workstation offline, creating at least one of a new virtualized server and new virtualized workstation from a protected image, blocking an action associated with at least one of the server and the workstation etc. In some embodiments, a mitigation action can also include removing authorization and access privileges for an entity associated with anomalous activity. Removing authorization and access privileges can include at least one of blocking network access, blocking access to network devices, blocking access to servers, blocking access to workstations, and blocking access to other computing devices. In some embodiments, RTAE 110 is integrated with one or more scoring engines into a single application.

In some embodiments, RTAE 110 provides a GPU-based environment for managing a massively large number of parallel computing threads for real-time analytics. An RTAE database can also be leveraged by all computational actors to run in near real time large-scale data processing tasks for sophisticated analytics. RTAE 110 includes a real time statistical engine for summarizing the status of enterprise in visualization engine, dashboard and monitor 112; and a real time engine for processing TIMs from multiple sensors 102, computing the appropriate mitigation action if any, and sending the appropriate TIM (including score, alert, update, mitigation action, etc.). RTAE 110 also includes a REST-based API, so that the various system components can access data and information in the RTAE 110 in a uniform way, independent of the particular the particular analytic, process or component within the RTAE 110 that produced the data or information. Due to the volume of data and the near real time computations required, specialized processors that can process large blocks of data in parallel, such as the GPUs used in some embodiments of the present disclosure, are used in the RTAE 110.

RTAE 110 can also send command and control (C2) messages called threat intelligence messages (TIMs) to other components in the cyber security framework. For example, the RTAE 110 performs a wide range of event based actions such as updating analytics, visualizations and alerts, mitigation actions for the control plane and distributed sensor updates, etc. Flow agents managed by the RTAE 110 similarly provide the intelligence for the wide variety of agents enabling publication and subscription requests and what metachannels are related to specific topics, types, and concepts.

In some embodiments of the present disclosure, the RTAE 110 produces mitigation TIMs sent from one or more behavioral models. In some embodiments, the TIMs are sent to the ESB 116 by scoring engines 108. The various TIMs are collected by the RTAE 110, processed, integrated and fed into another model, which, depending upon the results from the new model, may result in a mitigation. In some embodiments, an RTAE 110 communicates a mitigation TIM over ESB 116 to one or more mitigation agents 210, the mitigation TIM including instructions to take specific mitigation actions, such as closing a port.

Figure 5:
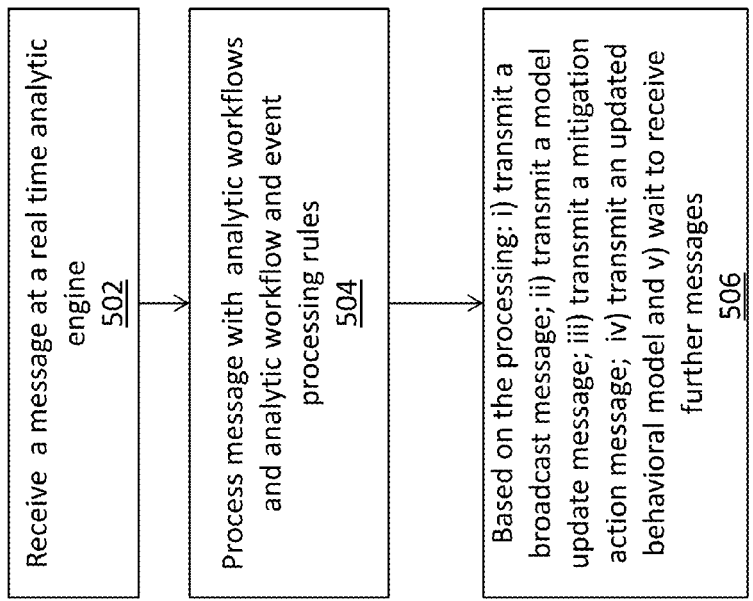
FIG. 5 is a flowchart illustrating a method of processing and sending messages by the real time analytic engine, according to some embodiments of the present disclosure.

FIG. 5 is a flowchart illustrating a method of processing and sending messages by the real time analytic engine, according to some embodiments of the present disclosure.

Referring to step 502, first one or more messages, such as TIMs, are received by an RTAE 110 from one or more scoring engines, the distributed analytic platform or other system components. As described in more detail herein, the first message can include a TIM generated by the scoring engine or the distributed analytic platform. The TIM can include data associated with an alert or with making a small modification to a PFA document. RTAE 110 can also receive analytic workflows from distributed analytic engine and analytic workflow and event processing rules. In some embodiments, the analytic workflow and event processing rules can specify thresholds associated with analytic models or analytic workflows. For example, an analytic workflow and event processing rule can specify that all activity related to a certain analytic workflow with scores beyond a certain threshold be classified as anomalous activity. As described herein, anomalous activity can include a reconnaissance, exploit, intrusion, compromise, insider threat, and attack.

Referring to step 504, RTAE 110 processes the received TIM using the analytic workflows and the analytic workflow and event processing rules. In some embodiments, entity information is retrieved from the TIM, the associated state information is retrieved from the RTAE 110, and the state information is updated with information extracted from the received TIM. In some embodiments, the stored state information is associated with previously received messages from at least one of sensors, scoring engines and the distributed analytic platform.

Referring to step 506, RTAE 110 can take the following actions based on the processing: i) transmit a broadcast message, ii) transmit a model update to a scoring engine when the RTAE 110 determines that an updated model is likely to improve the detection rate or reduce the false positive rate of the current model; iii) transmit a mitigation action using the control plane engine and mitigation agents when the RTAE 110 determines that the received TIM indicates an intrusion or probable intrusion, or other anomalous activity; iv) transmit an analytic model when changes to an analytic workflow exceed a threshold; and v) wait to receive additional TIMs. In some embodiments, RTAE 110 processing also includes analyzing the updated state information to determine if any action should be taken. In some embodiments RTAE 110 can send one of a broadcast message, mitigation message and model update message after receiving a first output at a first time from scoring engines, the distributed analytic platform, and the plurality of sensors. In some embodiments, RTAE 110 waits to receive several outputs from scoring engines, the distributed analytic platform, and the plurality of sensors prior to sending one of a broadcast message, mitigation message and model update message.

As described above, RTAE 110 can transmit one of a mitigation TIM, a model update TIM and an analytic model based on the processing. For example, a TIM received by an RTAE 110 indicating a likely intrusion at a port detected by a sensor and scoring engine associated with the port can result in a mitigation TIM being sent, which will close the port. At the same time, RTAE 110, based on the same received TIM, can send to all the scoring engines a model update changing a parameter in the scoring engines to better account for the intrusion or effects related to the intrusion. If the RTAE 110 determines that a scoring engine or other system component requires a change more significant than a threshold amount of change, the RTAE 110 can send an updated behavioral model instead of the model update. In some embodiments, RTAE 110 can also send a broadcast message, which can include at least one of a cyber event message and an alert message.

Control Plane Engine 114.

The control plane engine 114 relates to monitoring, configuring and re-configuring network devices, including switches, routers and firewalls. The control plane engine 114 is responsible for taking mitigation actions, communicating with mitigation agents, sending alerts related to the control plane, and supplying data so that the visualization engine, dashboard and monitor 112 can provide situational awareness of the control plane infrastructure. Situational awareness in this context refers to information that provides a summary of the entities in the control plane; current traffic on the control plane; the normal traffic on the control plane; deviations, if any, between the current traffic and normal traffic; and other information related to unusual activity, activity associated with potential bad actors, or related behavior. In some embodiments, control plane engine 114 gets mitigation TIMs from RTAE 110, scoring engine 108 and distributed analytic platform 106.

The control plane engine 114 includes C2 compute actors that generate real time command and control messages. Pre-planned actions are managed throughout the control plane and data plane, such as blocking specific IPs, isolating a suspicious workstation or redirecting packet flows.

The control plane engine 114 includes DNS, DHCP, and IP address management (DDI) 140. The DDI module 140 includes global device graph, trust protocol ID within control flows and device and flow fingerprints. Global device graph includes a visual representation of all network devices and activity. Trust protocol ID within control flows includes encrypted strings within packets. Device and flow fingerprints are managed by the control plane and utilize the dynamic host connection protocol (DHCP) to uniquely fingerprint all devices on the network.

Other System Components.

Other system components include a registry (not shown) that is accessible by all components. In some embodiments, the registry includes highly available data about commonly used services, data structures, message formats, and other information that simplifies the development and operation of the system.

Behavioral Modeling and Real Time Scoring

In some embodiments of the present disclosure, behavioral models are utilized to quantify the likelihood of cyber intrusions, the presence of bad actors (whether external actors or "insiders"), and other behavior that warrants action, either the manual examination by a cyber-analyst or the automated action of a mitigation device.

In the present disclosure, a behavioral model refers to a statistical, data mining or other type of algorithm that takes inputs (or "events"), processes the inputs to compute features, and processes the features to compute outputs (or "scores"). Events as described herein usually refer to a temporally ordered stream of inputs that are processed one by one.

FIGS. 6(*a*)-(*c*), 7 and 8 are system diagrams showing different ways that events can be presented by behavioral models, according to some embodiments of the present disclosure.

For real time or near real time analytics, events are presented event-by-event and can be scored event-by-event to produce outputs in a variety of ways. FIG. 6A is a flow chart showing processing of inputs or events directly, according to some embodiments of the present invention data attributes 602 are used to produce features 604. In some embodiments, features 604 are formed by transforming or aggregating data attributes. For example, if the data attribute corresponds to a flow record, an example of a feature can include a binary variable that equals 1 when the flow is a short duration flow, and 0 otherwise. Features 604 are in turn processed by a model 606 to produce model outputs 608. FIG. 6B is a flow chart showing associating one or more feature vectors (also referred to herein as state vectors) with each event, according to some embodiments of the present disclosure. An event is received 610, and data attributes are determined for the event 612. The data attributes are used to produce features for the event 614. When a new event is processed, the associated stored feature vector or feature vectors, which are persistent from event to event, are retrieved and updated with the data from the new event 616. After the feature vector(s) is updated 618, it is used as the input to a behavioral model 620 to produce outputs 622. An example of a feature vector that is updated with each event is a normalized number of flows in a specific time window (e.g., within a 10 second moving time window). FIG. 6C is a flow chart illustrating pre-processing 638 and post-processing 640 of an analytic model, according to some embodiments of the present disclosure. Data pre-processing 638 transforms or aggregates the data, creates feature vectors, and performs other processing as desired, prior to passing the data to an analytic model 630. Post-processing 640 transforms and aggregates, computes additional outputs, and performs other processing as required. As an example of post-processing, a post-processing module can compile and evaluate various statistics to determine if the model has seen enough events to be considered statistically valid. If statistically valid, the score is sent out; otherwise, the score is suppressed. For the methods shown in FIGS. 6(*a*), 6(*b*), and 6(*c*) multiple models can be used, with the outputs of one or more models being used as the inputs to one or more other models, as described in more detail below in the description accompanying FIGS. 8(*a*), 8(*b*) and 8(*c*).

For batch processing of data in analytics, inputs are gathered together in a file, or multiples files, and the file(s) are processed to produce the outputs associated with the analytic models. As mentioned above, for the sizes of data that is typical in cyber applications, a distributed analytic platform is used for the analytic processing.

Figure 7:
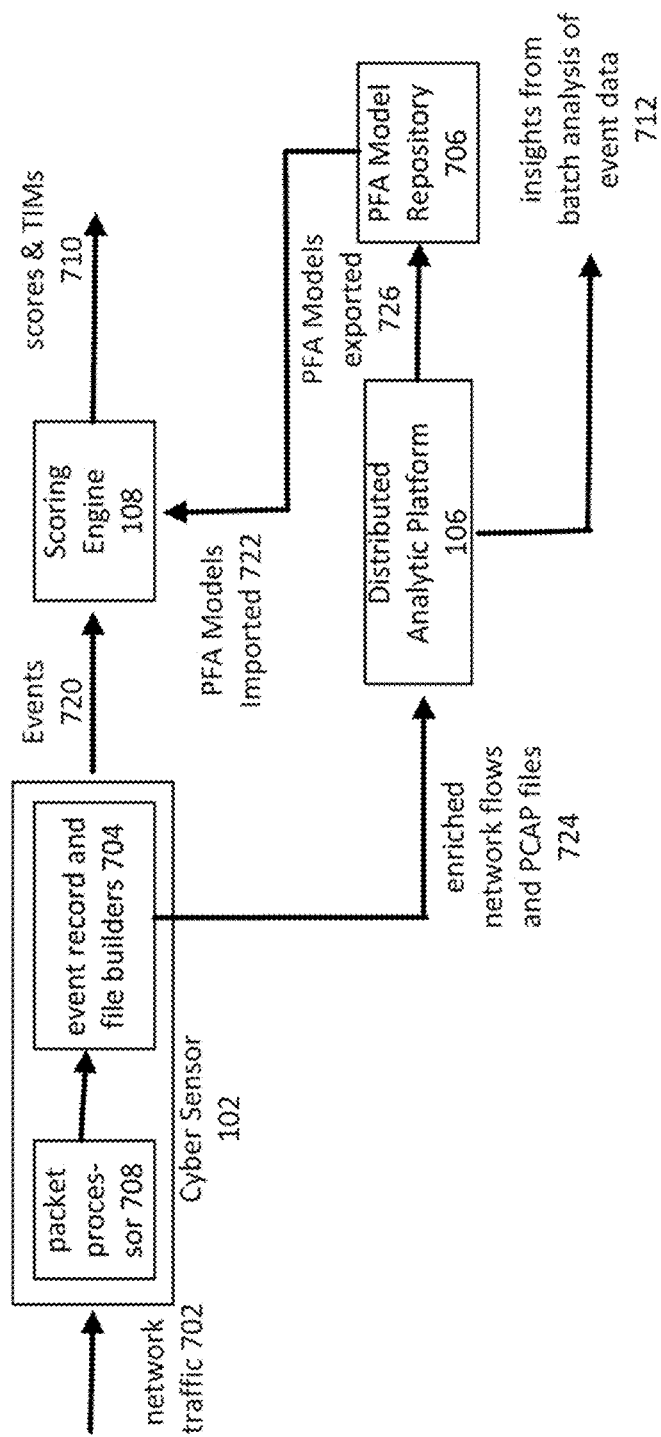
FIG. 7 is a system diagram showing processing of network traffic to produce analytic models, which are imported into scoring engines, according to some embodiments of the present disclosure.

The models themselves that are used to process events to produce outputs can also be produced in different ways. As shown below in FIGS. 7 and 9, a distributed analytic platform 106 can be used to process the inputs to models to produce the analytic model. In some embodiments of the present disclosure, the model is expressed in a model interchange format, such as PFA, when can then be used for scoring events in batch using a distributed analytic platform, or in streaming fashion using a scoring engine. In one of the embodiments of the present disclosure, PFA models can also be produced by two other system components: the RTAE and the scoring engine itself FIG. 7 is a system diagram showing processing of network traffic to produce analytic models, according to some embodiments of the present disclosure. FIG. 7 shows network traffic 702, event record and file builder 704, PFA models repository 706, packet processor 708, scores 710, insights from batch analysis of event data 712, events 720, PFA models imported 722, enriched network flow and PCAP files 724, PFA models exported 726, sensor 102, distributed analytic platform 106, and scoring engine 108.

Network traffic 702 is collected by sensor 102. Sensor 102 includes packet processor 708, which is designed to process packet data at line speed (i.e., the speed in which data is moving through the network). Packet processor 708 is able to process packet data at line speed using highly optimized software stacks, and, in some embodiments of the present disclosure, specialized hardware. In some embodiments, a zero copy technique is used for improving packet processing performance. Packet processing includes extracting attributes of packets, such as destination and source ports and IPs, protocol flags and other attributes of TCP packets, UDP packets, etc., looking at combinations of extracted attributes to identify specific protocols, and enriching the information with other data, such as Dynamic Host Configuration Protocol (DHCP) data, geo-location data, etc. Information from multiple packets corresponding to the same source and destination IPs and ports are processed to produce flow records by event record and file builder 704 that are passed to the scoring engine 108 through the ESB 116. In some embodiments of the present disclosure, information from single or multiple packets are processed to produce other types of events that are passed to the scoring engine 108 through the ESB 116. For example, in some embodiments of the present disclosure, each packet can scored individually by the scoring engine 108; selected packets, such as those corresponding to one or more protocol types, or other attribute or feature, can be scored; or other combinations of packets can be processed by the scoring engine 108. Multiple packets are also processed by event record and file builder 704 to produce files of packets (PCAP files) that are passed to the distributed analytic platform 106. In some embodiments of the current disclosure, the sensor 102 processes data in collaboration with an entity engine. The role of the entity engine is to enrich the flow events and PCAP files with unique entity identifiers since IP addresses often times change within enterprise environments that use DHCP.

Figure 8A:
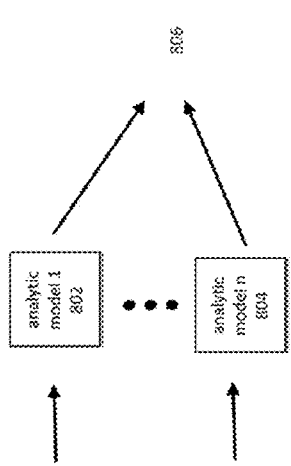
FIG. 8A is a system diagram showing an ensemble of models, according to some embodiments of the present disclosure.
Figure 8B:
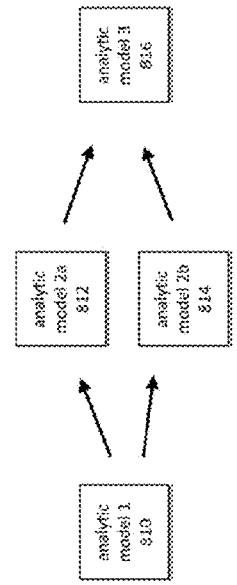
FIG. 8B is a system diagram showing a composition or chaining of models, according to some embodiments of the present disclosure.

The sensor 102 transmits events 720 to scoring engine 108 for real time scoring over an ESB 116. In some embodiments, scoring engine 108 reads a PFA file 722 from a PFA model repository 706 containing a description of multiple models, how to pre-process the inputs to models, how to post-process the outputs of models, how to compose models, how to send events to segmented models, etc. In some embodiments, an imported PFA file 722 can express an analytic workflow. In some embodiments, the analytic workflow contains multiple segmented analytic workflows, each associated with a logical segment. For example, FIG. 8A shows how the outputs of multiple analytic models can be combined to produce a single output, while FIG. 8B shows how the output of one analytic model can be used as the inputs to two or more other analytic models. Analytic models include, but are not limited, to cluster models, baseline models, classification and regression trees, neural networks, random forests, Bayesian models, and any of the other statistical and machine learning analytic models that are known to experts in the field. Scoring engine 108 converts scores of each event and creates multiple types of TIMs, including TIMs containing scores, event notification, or alert notification, model update TIMs, and mitigation TIMs 710. In some embodiments, scoring engine 108 can build additional event features from the received event information. In some embodiments, sensor 102 is controlled by the RTAE 110, which can change the type of packets and flows collected, how events and flows are processed by the sensor, etc.

Sensor 102 also transmits network flow records and PCAP files 724 to distributed analytic platform 106. The data transmitted by the sensor may be enriched by adding at least one of: data and metadata about entities observed, data and metadata about the network traffic, data and metadata associated with users, data and metadata about workstations and servers, data and metadata about routers and switches, data and metadata about external network entities, and data and metadata about internal and external devices interacting with the network. Distributed analytic platform 106 processes the received information, in multiple ways, including using statistical algorithms, machine learning algorithms, and other algorithms to build analytic models that can be executed by the scoring engine. Processing of the received information in multiple ways as described above is an example of the batch processing of event data, flow data, and other data mentioned elsewhere in this disclosure. Analysis of the data processed in this way can lead to insights about cyber behavior 712, such as the presence of unusual or suspicious behavior. These models can be exported as a model interchange format, e.g., PFA models 726 to a PFA model repository 706. The PFA models are received by the scoring engine 108, added to existing collections of PFA models, which changes the collection of PFA documents accessed by the scoring engine 108 for processing the events. Distributed analytic platform 106 can also score the events in batch 712.

In some embodiments of the present disclosure, inputs can be network flow records produced by the sensor 102, packet records produced by the sensor 102, records extracted by the sensor 102 from log files from network devices, workstations, servers, or other systems, or records extracted via some other mechanism.

In some embodiments of the present disclosure, inputs are events that are associated with entities, such as network devices, users, etc., and the inputs are processed by retrieving one or more state vectors that store persistent information for that entity, updating the state vector using information from the event, and then using the update state vector as the input to the model.

In some embodiments of the present disclosure, and as described above with respect to FIG. 2, one or more sensors 102 collect and process data from the enterprise being protected, produce event based records, pass the event based records to the system's ESB 116, and one or more scoring engines 108 read the event based records from the ESB 116, and process the event based records to produce various outputs.

In some embodiments of the present disclosure analytic models are deployed in scoring engines 108 in order to detect cyber behavior and changes in cyber behavior at line speed as network data is processed. Analytic models deployed in scoring engines can be utilized for many different use cases in a cyber-network. For example, an analytic model in a scoring engine 108 can be used to detect unexpected changes in network devices, workstations, servers, etc. Unexpected changes can be defined in several ways, including, for example, by changes in the communication patterns of devices on the networks ("communities of interest"). In this case, different types of models, including baseline models, can be used to detect changes. Using baseline models to detect changes can also be employed to detect insider or lateral movement threats. Scoring engine 108 can also be used to accumulate suspicious behavior across sources. For example, certain flows may occur at night from certain countries. If some of these flows are also found to be associated with failed login attempts, then the risk associated with all of these flows would be elevated. When the risk score passes a threshold, an alert is sent.

Figure 8C:
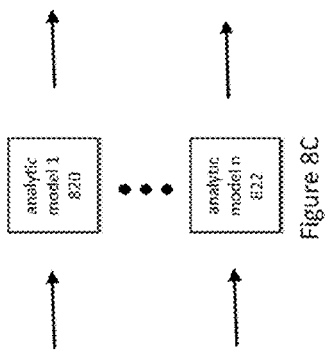
FIG. 8C is a system diagram showing segmented models, according to some embodiments of the present disclosure.

In some embodiments of the present disclosure, multiple models are present and can be combined in different ways. FIG. 8A is a system diagram showing an ensemble of models, according to some embodiments of the present disclosure. Analytic models 1 802 through n 804 are combined to get a single output score 806. The analytic models can be combined using averaging, voting, or any other method of combining the models. For example, voting is used to combine categorical outputs from multiple models (corresponding to a single input), in which the category that occurs most frequently as the output of the models is selected as the output of the ensemble. FIG. 8B is a system diagram showing a composition or chaining of models, according to some embodiments of the present disclosure. The output of analytic model 1 810 can be fed as inputs into analytic model 2a 812 and analytic model 2b 814. The outputs of analytic models 2a and 812 and 2b 814 can be used as the inputs to the analytic model 3 816. In some embodiments, analytic model 1 810, analytic model 2a 812, analytic model 2b 814, and analytic model 3 816 can be any model. For example, the models are not restricted to a particular subset of models. The models can be chained together in any configuration. FIG. 8C is a system diagram showing segmented models, according to some embodiments of the present disclosure. Each model 820, . . . , 822 is associated with a unique key to distinguish the segments. Since the models will in general be different between the different segments, the same input event will create multiple different outputs, corresponding to the various different models, associated with the various segments.

In some embodiments of the present disclosure, Portable Format for Analytics (PFA) is used, since it supports the three types of multiple models mentioned above, whereas other Model Interchange Formats (MIF), such as Predictive Model Markup Language (PMML), only support limited types of composition of models, not arbitrary chaining together of the outputs of one or more models into the inputs of one or more other models, as is, for example, supported by PFA.

In some embodiments of the present disclosure a model producer is used that exports a MIF document that is imported into one or more scoring engines. In some embodiments of the system the MIF document is sent over the ESB 116 to the scoring engines 108 and in some embodiments the MIF document is loaded into the scoring engine 108 via another mechanism, including an out of band network linking the distributed analytic platform 106 to the scoring engines 108. In some embodiments, the MIF document is a PFA document.

In some embodiments of the present disclosure, there are several different types of TIMs that are outputs of the models. These include: i) scores associated with input events that are stored for potential analysis in the future; ii) scores associated with input events that are sent for further processing; iii) model update TIMs; and iv) mitigation TIMs.

Updating Behavioral Models.

Figure 9:
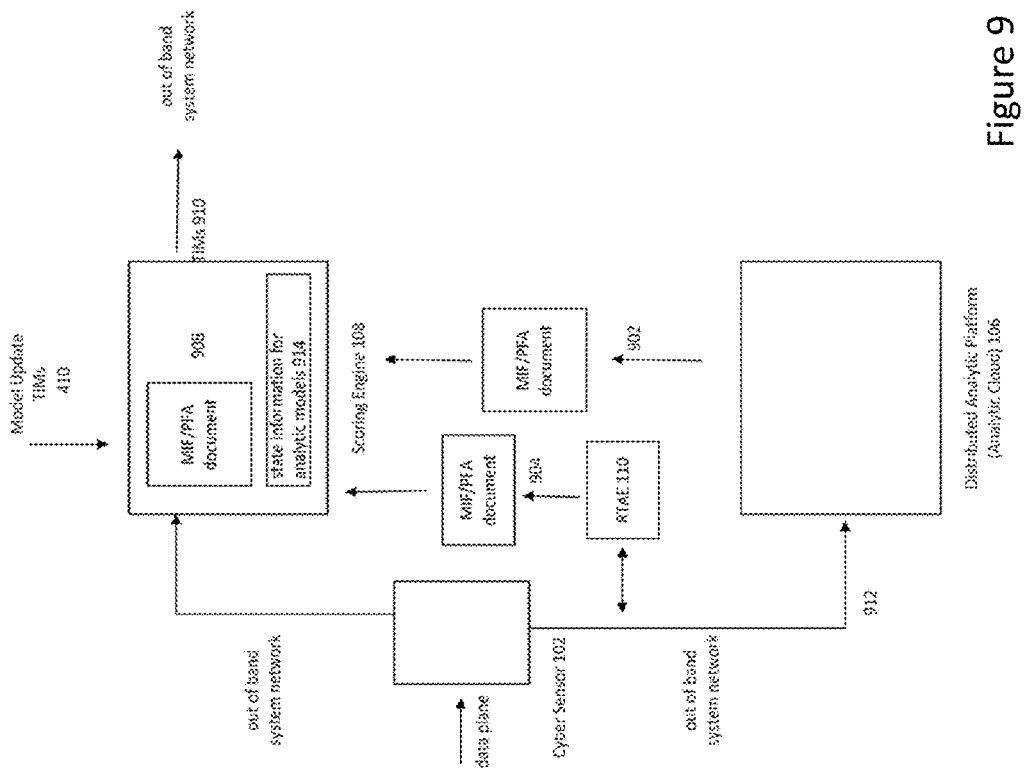
FIG. 9 is a flow chart depicting flow of data between components in the cybersecurity framework, according to some embodiments of the present disclosure.

FIG. 9 is a flow chart depicting flow of data between components in the cybersecurity framework, according to some embodiments of the present disclosure.

As described briefly above and in more detail below, RTAE 110 and control plane engine modules and agents can take mitigation actions. For example, the analytic model in the scoring engine 108 can be updated in one of four ways. First, a new analytic model can be created in a batch analytic job and exported in a model interchange format 902. In some embodiments of the present disclosure, the batch analytic job is run in the distributed analytic platform 106 and exported as PFA. The batch analytic job uses as inputs data from the sensors 102, such as network flow data, PCAP data, and data from other systems and sensors. Second, a new analytic model can be created in near real time using the RTAE and exported in a model interchange format 904. In some embodiments of the present disclosure, the RTAE 110 exports the model as PFA. Third, changes to the model itself can be made through a model update TIM 410. A model update TIM 410 can include information so that particular values, variables, and PFA elements in the PFA document can be updated without replacing the entire PFA document. Since PFA documents can be large in size, the ability to update specific values and elements using a model update TIM that is the result of processing TIMs and other information by the RTAE 110 contributes to the speed at which data is processed. Fourth, the parameters of the analytic model itself can be updated in the case the model is a streaming model in which the parameters or other components of the model 914 (vs state information associated with entities) is updated when events are processed 908. A streaming model in this context is an analytic model that is built from data that is processed just once as it passes through the scoring engine. This is in contrast to analytic models that are built with batch analytics, as described above, in which data records are persisted to disk, such as the disk associated with the distributed analytic platform 106, and can be read and processed as many times as the particular algorithm or analytic requires.

As described above, in some embodiments, sensors 102 receive input events from network traffic. Type of input events can include events from network packets, events from network flows, events from monitoring systems, events from log files, and events from other systems and applications. Also as described above, an output of the scoring engine 108 can include TIMs. In some embodiments, TIMs can include scores associated with events that are stored for potential analysis in the future, scores associated with events that are sent for further dynamic processing, model update TIMs, and mitigation TIMs.

An element of the present disclosure is that multiple scoring engines 108, multiple sensors 102, or other components of the system can concurrently send messages to the ESB 116 and the scoring engines 102 can be concurrently updated. In some embodiments of the present disclosure there are multiple scoring engines 108, which read model update TIMs. In other words, multiple sensors 102 can be used with model update TIMs sent over the ESB 116 to concurrently update a scoring engine 108; a single sensor 102 may send model update TIMs over the ESB 116 to update concurrently multiple scoring engines; or multiple sensors and multiple scoring engines may send model update TIMs to update concurrently multiple scoring engines 108 using multiple sensors 102. In some embodiments, the system described herein includes only one scoring engine 108 connected to multiple sensors 102.

In some embodiments of the present disclosure, the scoring engine 108 is designed so that model update TIMs can be processed concurrently with scoring of events by the scoring engine so that it is not necessary to stop the scoring engine in order to update it with a model update TIM. This ability to process changes to PFA documents at the same time that the scoring engine 108 scores events exists because the PFA standard contains language components that supports concurrency as described above. In some embodiments of the present disclosure the implementation of the scoring engine 108 supports the various concurrency elements supported by the PFA standard.

The RTAE 110 processes TIMs and events from the scoring engines 102 and other system modules and determines mitigation actions. TIMs containing mitigation actions are sent to mitigation agents, which perform the mitigation actions, which, in some embodiments, use the control plane to change control network devices, such as routers and switches. In some embodiments, the RTAE 110, scoring engines 108, and related system modules are on an ESB 116 running over the out of band system network.

A component of the current present disclosure is the support for an analytic framework that can use multiple models that can be combined in different ways, including the following: i) segmented models, in which the inputs are sent to one or more of the individual models, with each model associated with one or more restrictions, such as specified time period, a specified network segment, etc.; ii) ensembles, in which the inputs to the models are common and the outputs of two or more models are combined into a single output; or, iii) compositions of models, in which the output of one or more models are used as the input of another model.

In some embodiments, models need to be periodically rebuilt or retrained to take into account changed conditions, such as new behavior or improvement in modeling technology. When a new model is created, new models can be compared against current models to choose a winner (e.g., using champion-challenger methodologies).

In some embodiments, the process is human readable and auditable. Models can also be incrementally updated. This allows for models to be moved into production and to be built from live data rather than waiting for enough valid and appropriate historical training data.

In addition to the types of TIMs already mentioned, an important component of the present disclosure is the use of external TIMs. External TIMs, as described in the present disclosure refer to TIMs generated outside of the enterprise by other enterprises either employing instances of the systems or instances of other systems that generate TIMs that can interoperate with TIMs used by the system described in the present disclosure.

External TIMs work as described above with the exception that external TIMs corresponding to other instances of the system described in the present disclosure do not contain any identifying information of the enterprise that generated them, but instead information such as information about external IPs, new thresholds or components for PFA documents, new post-processing rules, etc. that can be shared between two more enterprises running the system described in the present disclosure.

In some embodiments of the present disclosure, external TIMs are created by the RTAE 110 of the first enterprise; encrypted before being passed from the first enterprise to the second enterprise; decrypted by the second enterprise; passed to the RTAE 110 of the second enterprise. After being received by the RTAE 110 of the second enterprise, the external TIM is processed similarly to the way that internal TIMs are processed.

External TIMs can be processed automatically by the RTAE 110 of the enterprises that receive them, and, unlike, other types of threat information shared between enterprises, are not designed for manual processing.

In some embodiments of the present disclosure, external TIMs can be generated by other systems using conventions and standards worked out by the various enterprises sharing external TIMs. For example, TIMs can contain information changing threshold for certain types of alerts, such as those associated with lateral movements within an enterprise or exfiltration of data out of an enterprise. When one enterprise that accepts and sends external TIMs detects a threat of one of these types, it can automatically generate an external TIM that can sent to other enterprises that accept external TIMs, which in turn can process the external TIM, and take actions to lower the thresholds for the attack observed by the first enterprise.

Streaming Analytics.

In some embodiments of the present disclosure, streaming analytics are used within the scoring engine 108 to update the parameters of the model, the features used in the model, or the structure of the model itself, versus only updating the states associated with entities that are scored by the model. In some embodiments of the present disclosure when a first score is received at post-processing, various statistics are compiled and evaluated to determine if the model has seen enough events to be considered statistically valid. If statistically valid, the score is sent out; otherwise, the score is suppressed.

For example, the variance or other statistical attributes of the distributions associated with one or more features in the model can be computed and when these statistics fall below a threshold, scores can be emitted by the model.

Micro-Segments for Cyber Analytics

In some embodiments, an enterprise can be divided, including the internal and external entities that interact with the enterprise, into logical segments that can be independently modeled, monitored and mitigated. The logical segments are also referred to herein as micro cyber segments. As described below, each logical segment can associate: i) at least one of an analytic model, a set of analytic models, or an analytic workflow; ii) one or more sources of inputs about activity within the logical segment (e.g., tap points); and a set of actions for mitigating the impact of the anomalous activity occurring within the logical segment.

The present disclosure in some embodiments makes use of thousands to hundreds of thousands or more micro cyber segments. In some embodiments of the present disclosure, different ways to divide an enterprise into micro cyber segments are used, depending upon the cyber behavior of interest, the analytic model being used, and the mitigation being used. In other words, in some embodiments, different, often overlapping, micro cyber segments are used at the same time.

A micro cyber segment is defined by splitting an enterprise using one or more dimensions. Dimensions can be defined using attributes of the network, including IP, network segment; attributes of the devices being modeled, including type of device, etc.; features of the network or device, such as number of flows during a specified time window, cardinality of the graph created when one device communicates with another device, etc.; features of the flows associated with a device, such as type of protocol used, etc.; attributes and features of the internal and external entities that interact with the network, including type of user, role of user, etc.; temporal dimensions, such as time of day, day of week, etc.

A micro cyber segment can be created by using one dimension and creating different segments by partitioning the dimension into different regions; or taking the product of two or more dimensions, and separately partitioning each dimension to create multi-dimensional segments.

Once the partitioning into different segments is done, a separate analytic model for the data associated with the entities in that segment is computed. For this to be done, some embodiments use sensors that monitor relevant data for entities, users or flows associated with that segment and collect and process the data.

In addition to monitoring and modeling a micro cyber segment, one or more mitigation actions are defined for that segment. Mitigation actions may include black listing the entities associated with that segment so that switches and routers no longer send data to the entities in that segment; black listing certain ports associated with the entities in that segment; modifying data flowing into or out of the segment; redirecting traffic to or from the segment; restarting the entities associated with devices in the segment from a clean install; using virtualization techniques or moving target techniques to increase the security of the entities, etc.

One of the criteria for deciding upon the appropriate segmentation is to create segments that are homogenous enough in their cyber analytic behavior that they can be modeled with an analytic model. For example, segments can be divided until the variance or other statistical attributes of the distributions associated with one or more features or other components of the models in a segment fall below a threshold and are stable over time. In some embodiments, the divisions can include a division of the network, a division of the traffic on the network, a division of users on the network, a division of devices on the network, a division based upon other data, including third party data, and data associated with at least one of the divisions of the network, the traffic on the network, the users on the network, the devices on the network, and third party data. In some embodiments, one or more divisions can overlap with another division.

In some embodiments of the present disclosure, analytic models associated with each micro cyber segment are expressed in model interchange format, such as PFA, and a scoring engine is used so that micro cyber segments can be monitored at line speed and mitigation events can be sent out in near real time as events are scored by the scoring engine.

Moving Target Defense Using Virtual Environments

In some embodiments, the RTAE 110 includes a virtual defense module (VDM) 150 that is integrated with micro cyber segments for creating, managing, and tearing down virtual environments including their corresponding virtual networks. The virtual networks associated with these virtual environments including routing information from $I_0$ and $I_1$ to $I_2$, as described above in FIG. 3. Virtual defense module 150 receives ID $I_0$ and ID $I_1$. As discussed above, ID $I_0$ includes data received external to a firewall, and ID $I_1$ includes data received internal to a firewall. In some embodiments, ID is an encrypted, immutable, globally unique ID (GUID) for all network and data packets within the cybersecurity framework, which enables machines to uniquely separate "allowed" activity from "suspicious" activity. ID can enable parallel real-world and virtual world environments to operate simultaneously in addition to their management, visualization, analytics, alerting, etc. ID enables unique baselines and analytics to be based on the entire history of all packets entering the cyber security framework throughout their processing and utilization history. In some embodiments, event triggers for enabled for machine speed pre-planned mitigations when ID packets are detected (e.g., lateral movement, unauthorized infrastructure changes, unauthorized VPNs, spoofing, etc.).

In some embodiments, virtual defense module 150 utilizes secure virtual machines or virtual containers with IDs to create and manage both "trusted" and "untrusted" physical and virtual environments for dynamic complexity. In this way, a "virtual attack surface" can be created for identifying suspicious activity. This forces the attacker to distinguish the real ("trusted") enterprise data and processes from the hundreds to tens of thousands of virtual environments ("untrusted") dramatically reducing the probability that an attacker is successful and increasing the probability of detection and mitigation. DDI infrastructure can also be utilized to manipulate packet flows and interconnections within and between the virtual and real world networks and components. Virtual defense module 150 can dynamically re-direct from the control plane suspicious active to specified virtual environments for pre-planned actions triggered by scoring engine. Trust relationships can be enabled between the container, its content and the framework thereby extending uses for Identity Access Management (IDAM) and Attribute Based Access Control (ABAC) for policy based access control to all data and machine processes within the cyber security framework.

Example Detection and Mitigation

Figure 10:
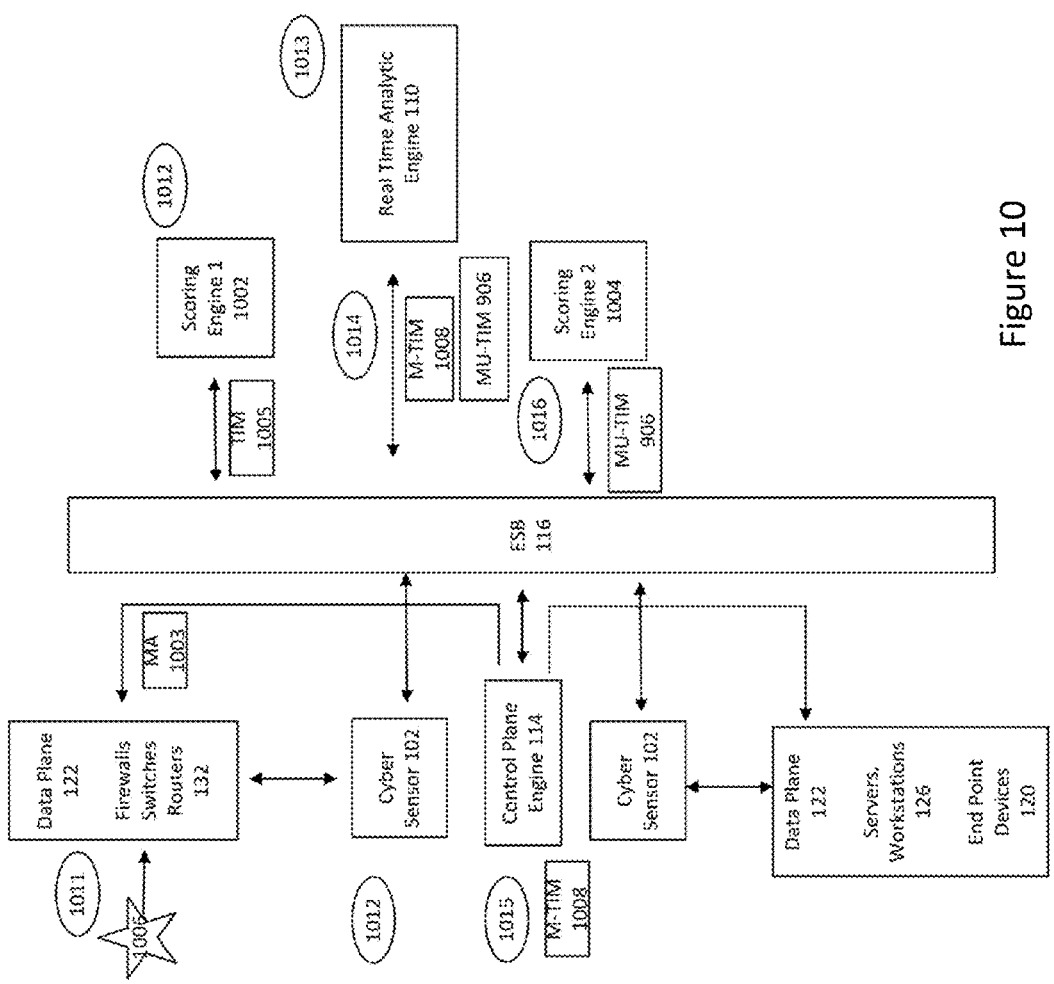
FIG. 10 is a system diagram illustrating a response to an external threat to the cyber security framework, according to some embodiments of the present disclosure.

FIG. 10 is a system diagram illustrating a response to an external threat to the cyber security framework, according to some embodiments of the present disclosure. The process includes an external bad actor 1006 initiating an attack, sensor 102/scoring engine 1 1002 detects threat and publishes a TIM 1005, RTAE 110 receives message and decides on mitigation and publishes to ESB 116, control plane engine 114 receives mitigation action (MA) 1003 within mitigation TIM 1008, sensors 102 and scoring engine 2 1004 receive model update TIM 906 and update state, and control plane engine 114 takes action closing the port. Scoring engine 1 1002 and scoring engine 2 1004 have similar functionality as scoring engine 108 described herein.

At step 1011, the attack initiated by the external bad actor 1006 bypasses IDS and firewall Access Control List (ACL) rules and passes through the firewall 132.

At step 1012, sensor 102 processes packets and flows from the external threat 1006. Scoring engine 1 1002 generates TIM 1005 when it detects a threat event. Scoring engine 1 1002 publishes threat event and TIM 1005 to distributed ESB 116.

At step 1013, RTAE 110 receives the threat event and TIM sent by ESB 116. RTAE 110 process TIM 1005 from scoring engine 1 1002, and RTAE 110 decides on mitigation based on the TIM 1005.

At step 1014, RTAE 110 decides on mitigation. RTAE 110 publishes one of a model update TIM 906 and a mitigation TIM 1008 to all elements connected on ESB 116.

At step 1015, control plane engine 114 receives a mitigation TIM 1008 associated with IP reputation changes resulting in actions such as blocking the IP or port or alerting analysts of anomalous activity. Control plane engine 114 takes mitigation action 1003 by closing the port used by the external actor 1006.

At step 1016, scoring engine 2 1004 and other scoring engines connected on the ESB 116 receive a model-update TIM 906 from RTAE 110 and change their scoring behavior to better detect bad actors employing similar behavior.

Figure 11:
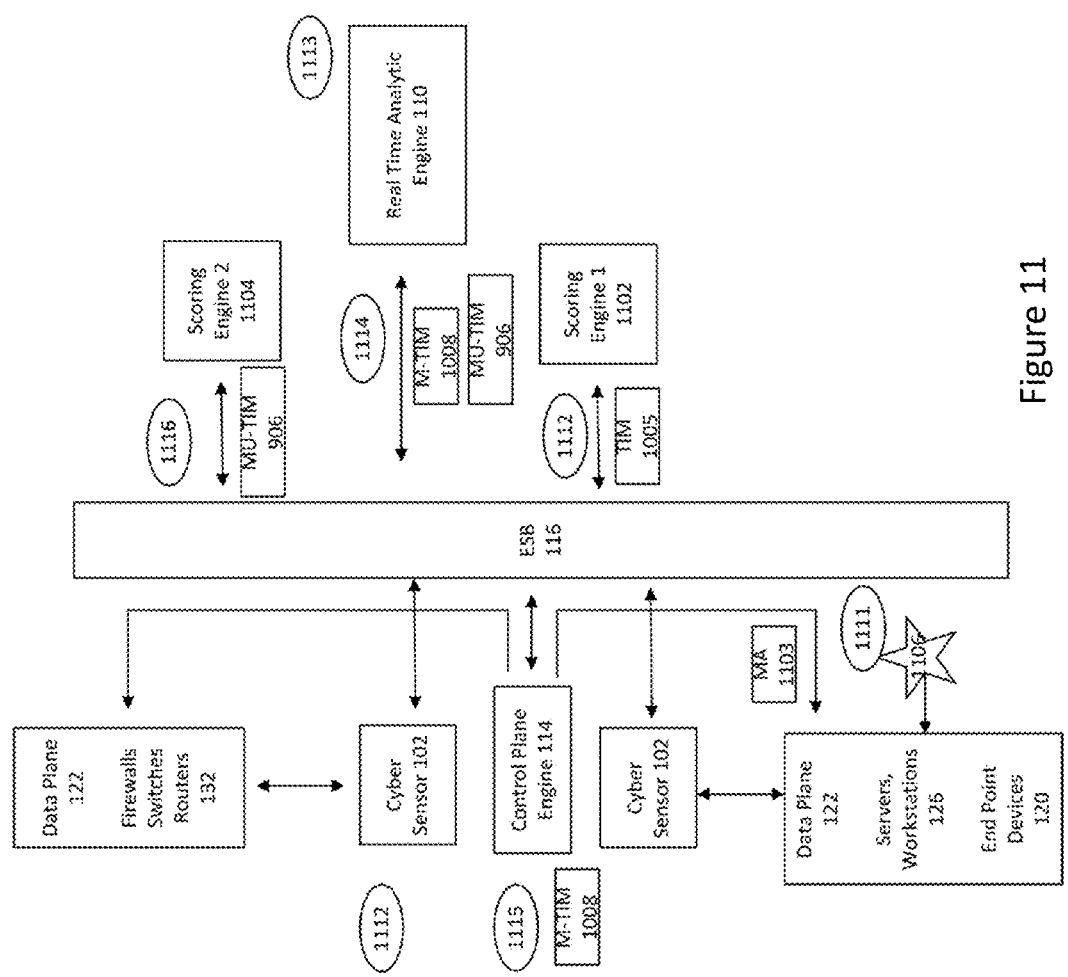
FIG. 11 is a system diagram illustrating a response an internal threat to the cyber security framework, according to some embodiments of the present disclosure.

FIG. 11 is a system diagram illustrating a response an internal threat to the cyber security framework, according to some embodiments of the present disclosure. The process includes an internal bad actor 1106 initiating an attack, sensor 102/scoring engine 1 1102 detects threat and publishes a TIM 1005, RTAE 110 receives message, RTAE 110 decides on mitigation and publishes to ESB 116, control plane engine 114 receives a mitigation TIM 1008, sensors 102/scoring engine 2 1104 receives model update TIM 906 and updates state, and control engine plane 114 takes action closing port. Scoring engine 1 1102 and scoring engine 2 1104 have similar functionality as scoring engine 108 described herein.

At step 1111, an internal actor 1106 initiates network reconnaissance (e.g., reconnaissance of critical assets) within the enterprise network.

At step 1112, sensor 102 processes packets and flows associated with the internal threat. Scoring engine 1102 creates events from the packets and flows and sends a TIM 1005 to ESB 116.

At step 1113, RTAE 110 processes the TIM 1005 sent by ESB 116. In step 3, RTAE 110 decides on mitigation based on the TIM. RTAE 110 publishes mitigation TIM 1008 over the ESB 116 to control engine plane 114 and to all entities affiliated with the mitigation actions in the data plane 122 such as firewalls, routers, switches 132 or endpoints 120 such as workstations, servers or mobile devices.

At step 1114, the mitigation TIM is sent to the ESB 116.

At step 1115, control plane engine 114 receives the mitigation TIM 1008. Control plane engine 114 takes action by closing the port used by the internal bad actor 1106.

At step 1116, scoring engine 2 1104 (and any other scoring engines on ESB 116) receive the model update TIM 906 from RTAE 110 and change their scoring behavior to better detect bad actors with similar behavior.

The subject matter described herein can be implemented in digital electronic circuitry, or in computer software, firmware, or hardware, including the structures disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, including multi-processors, such as GPUs, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a LCD (liquid crystal display), LED (Light-Emitting Diode), OLED (Organic Light-Emitting Diode), or CRT (cathode ray tube) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes one or more back end components (e.g., a data server), middleware components (e.g., an application server), or front end components (e.g., a client computer having a graphical user interface or a web browser through which a user can interact with an implementation of the subject matter described herein), or any combination of such back end, middleware, and front end components, either on physical hardware, on virtual environments, or using container-based technology for deploying applications, such as Linux containers. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A cybersecurity system for processing events to produce scores, alerts, and mitigation actions, the system comprising:
 a plurality of sensors, each of the plurality of sensors being configured to:
  receive sensor data from a network,
  process the sensor data to form events, and
  transmit the events;
 a distributed analytic platform, the distributed analytic platform configured to:
  receive the events from the plurality of sensors,
  process the events to form analytic workflows and distributed analytic platform messages, each of the distributed analytic platform messages associated with at least one of an alert, an update to a first analytic model, and cyber behavioral information, each of the analytic workflows:
   associated with one or more logical segments, and
   including at least one of the first analytic model, a second analytic model, a rule, a data transformation, and a data aggregation, and
  transmit the analytic workflows and distributed analytic platform messages;

a plurality of scoring engines, each of the plurality of scoring engines being configured to:
receive the analytic workflows from the distributed analytic platform,
receive the events from at least one of the plurality of sensors,
process the received events using the analytic workflows to produce scoring engine messages, and
transmit the scoring engine messages; and
a real time analytic engine, the real time analytic engine configured to:
receive the analytic workflows from the distributed analytic platform,
receive analytic workflow and event processing rules,
receive the scoring engine messages from the plurality of scoring engines,
receive the distributed analytic platform messages from the distributed analytic platform, and
process the scoring engine messages and the distributed analytic platform messages using the analytic workflows from the distributed analytic platform and the analytic workflow and event processing rules to form a threat intelligence message, wherein the threat intelligence message comprises at least one of:
a broadcast message, the real time analytic engine configured to transmit the broadcast message,
a mitigation message, the real time analytic engine configured to transmit the mitigation message to a control plane engine for taking a mitigation action associated with a first logical segment of the one or more logical segments when the processing by the real time analytic engine indicates the mitigation action limits the impact of anomalous activity, and
a model update message, the real time analytic engine configured to transmit the model update message for updating one or more analytic workflows when the processing by the real time analytic engine indicates the model update message improves at least one of a detection rate of the anomalous activity and a reduction in a false positive rate,
each of the one or more logical segments associating:
at least one of the first analytic model, the second analytic model, a third analytic model, a set of analytic models, and an analytic workflow,
one or more sources of inputs about activity within the logical segment, and
a set of actions for mitigating an impact of the anomalous activity occurring within the logical segment.

2. The system of claim 1, wherein the plurality of sensors, the plurality of scoring engines, the distributed analytic platform, the real time analytic engine, and the control plane engine are connected using an out of band network.

3. The system of claim 1, wherein the plurality of sensors, the plurality of scoring engines, the distributed analytic platform, the real time analytic engine, and the control plane engine communicate by sending associated messages over an enterprise system bus.

4. The system of claim 2, wherein the plurality of sensors, the plurality of scoring engines, the distributed analytic platform, the real time analytic engine, and the control plane engine communicate by sending associated messages over an enterprise system bus.

5. The system of claim 1, further comprising an ingest actors module, the ingest actors module configured to:
receive third party application data from at least one of a third party application and a third party device, and
transmit the third party application data for further processing by at least one of the plurality of scoring engines, the distributed analytic platform and the real time analytic engine.

6. The system of claim 5, wherein the plurality of sensors, the plurality of scoring engines, the distributed analytic platform, the real time analytic engine, the control plane engine, and the ingest actors module are connected using an out of band network.

7. The system of claim 5, wherein the plurality of sensors, the plurality of scoring engines, the distributed analytic platform, the real time analytic engine, the control plane engine, and the ingest actors module communicate by sending associated messages over an enterprise system bus.

8. The system of claim 1, wherein the scoring engine is further configured to:
receive the model update messages, and
process the update messages concurrently with the processing of the events.

9. The system of claim 1, wherein to form at least one of the broadcast message, the mitigation message and the model update message, the real time analytic engine is further configured to:
receive a first output at a first time from at least one of the plurality of scoring engines, the distributed analytic platform, and the plurality of sensors;
retrieve first state information corresponding to the first output;
update the first state information with first output data;
process the updated first state information by an analytic workflow associated with the real time analytic engine to form processed updated first state information;
store the processed updated first state information in the real time analytic engine;
receive a second output at a second time from at least one of the plurality of scoring engines, the distributed analytic platform, and the plurality of sensors;
retrieve second state information corresponding to the second output;
update the second state information with second output data;
process the updated second state information by the analytic workflow associated with the real time analytic engine to form processed updated second state information;
form the at least one of the broadcast message, the mitigation message and the model update message based on the processed updated second state information; and
store the processed updated second state information in the real time analytic engine.

10. The system of claim 9, wherein the real time analytic engine is further configured to:
receive an interim output at a third time from at least one of the plurality of scoring engines, the distributed analytic platform, and the plurality of sensors, wherein the third time is subsequent to the first time and prior to the second time;
retrieve interim state information corresponding to the interim output;
update the interim state information with interim output data;
process the updated interim state information by the analytic workflow associated with the real time analytic engine to form processed updated interim state information; and
store the processed updated interim state information in the real time analytic engine.

11. The system of claim 1, wherein the analytic workflows comprise a Model Interchange Format document, wherein the Model Interchange Format document supports:
- a composition of analytic models; a segmentation of analytic models; an ensemble of analytic models;
- a composition of analytic models with rules;
- a composition of analytic models with pre-processing and post-processing stages, wherein the preprocessing and post-processing stages includes data transformations and data aggregations; and
- the analytic workflows, each of the analytic workflows further comprising compositions of at least one of the analytic models, the rules, the data transformations, the data aggregations, the segmentations, and the ensembles.

12. The system of claim 1, wherein the real time analytic engine is further configured to:
- transmit an updated behavioral model to one or more of the plurality of scoring engines when changes to one or more of the analytic workflows exceeds a threshold.

13. The system of claim 1, wherein the events comprise at least one of:
- data about network flows, data about packets, data about entities, data about users, data about workstations and servers, data about routers and switches, data about external network entities, and data about internal and external devices interacting with the network.

14. The system of claim 1, wherein one or more of the plurality of sensors and the plurality of scoring engines are integrated into a single application.

15. The system of claim 1, wherein the real time analytic engine is integrated with one or more of the plurality of scoring engines.

16. The system of claim 1, wherein the mitigation action comprises at least one of:
- closing at least one port,
- modifying of at least one packet data,
- controlling the transmission of packets or flows,
- blocking a subnet,
- blocking one or more Internet Protocols (IPs) or ranges of IPs, and
- blocking one or more internal or external IPs.

17. The system of claim 1, wherein the mitigation action comprises at least one of:
- taking at least one of a server and workstation offline;
- creating at least one of a new virtualized server and new virtualized workstation from a protected image; and
- blocking an action associated with at least one of the server and the workstation.

18. The system of claim 1, wherein the anomalous activity comprises at least one of a reconnaissance, exploit, intrusion, compromise, insider threat, and attack.

19. The system of claim 18, wherein the mitigation action comprises at least one of: modifying of at least one packet data, controlling the transmission of packets or flows, and removing authorization and access privileges for an entity associated with the anomalous activity, wherein removing authorization and access privileges comprises at least one of blocking network access, blocking access to network devices, blocking access to servers, blocking access to workstations, and blocking access to other computing devices.

20. The system of claim 18, wherein the anomalous activity is associated with at least one of an internal bad actor and an external bad actor.

21. The system of claim 1, further comprising a visualization engine, the visualization engine including a monitor, the visualization engine configured to:
- receive statistics and graphical images associated with the processing of scoring engine messages by the real time analytic engine; and
- display the statistics and graphical images on the monitor.

22. The system of claim 1, configured to exchange an external threat intelligence message with a compatible third party system, wherein:
- the external threat intelligence message is encrypted to provide a secure mechanism for transferring information;
- the information in the external threat intelligence message does not expose sensitive internal information about the system transmitting the external threat intelligence message; and
- the external threat intelligence message is formatted with a common Model Interchange Format.

23. The system of claim 1, wherein the distributed analytic platform is further configured to:
- receive the scoring engine messages; and
- process the scoring engine messages to form threat intelligence messages.

24. The system of claim 1, wherein the broadcast message comprises at least one of an information message, a cyber event message and an alert message.

25. The system of claim 1, wherein each of the plurality of logical segments is associated with at least one of a division of the network, a division of the traffic on the network, a division of users on the network, a division of devices on the network, a division based upon third party data, and data associated with at least one of the divisions of the network, the traffic on the network, the users on the network, the devices on the network and third party data.

26. The system of claim 25, wherein at least a first division overlaps with at least a second division.

27. The system of claim 26, wherein the plurality of sensors, the plurality of scoring engines, the distributed analytic platform, the real time analytic engine, the control plane engine, and the ingest actors module communicate by sending associated messages over an enterprise system bus.

28. A cybersecurity network comprising a plurality of the cybersecurity systems of claim 1, wherein each of the plurality of the cybersecurity systems is configured to exchange a selected threat intelligence message with one or more of the other cybersecurity systems, wherein:
- the selected threat intelligence message is encrypted to provide a secure mechanism for transferring information, wherein the information in the selected threat intelligence message does not expose sensitive internal information about the transmitting cybersecurity system.

29. A cybersecurity system for processing events to produce scores, alerts, and mitigation actions, the system comprising:
- a plurality of sensors, each of the plurality of sensors being configured to:
  - receive sensor data from a network,
  - process the sensor data to form events, and
  - transmit the events;
- a distributed analytic platform, the distributed analytic platform configured to:
  - receive the events from the plurality of sensors,
  - process the events to form analytic workflows and distributed analytic platform messages, each of the distributed analytic platform messages associated with at least one of an alert, an update to a first analytic model, and cyber behavioral information, each of the analytic workflows:

associated with one or more logical segments, and including at least one of the first analytic model, a second analytic model, a rule, a data transformation, and a data aggregation, and
transmit the analytic workflows and distributed analytic platform messages;

a scoring engine, the scoring engine configured to:
receive the analytic workflows from the distributed analytic platform,
receive the events from at least one of the plurality of sensors,
process the events using the analytic workflows to produce scoring engine messages, and
transmit the scoring engine messages; and a real time analytic engine, the real time analytic engine configured to:
receive the analytic workflows from the distributed analytic platform,
receive analytic workflow and event processing rules,
receive the scoring engine messages,
receive the distributed analytic platform messages from the distributed analytic platform, and
process the scoring engine messages and the distributed analytic platform messages using the analytic workflows from the distributed analytic platform and the analytic workflow and event processing rules to form a threat intelligence message, wherein the threat intelligence message comprises at least one of:
a broadcast message, the real time analytic engine configured to transmit the broadcast message,
a mitigation message, the real time analytic engine configured to transmit the mitigation message to a control plane engine for taking a mitigation action associated with a first logical segment of the one or more logical segments when the processing by the real time analytic engine indicates the mitigation action limits the impact of anomalous activity, and
a model update message, the real time analytic engine configured to transmit the model update message for updating one or more analytic workflows when the processing by the real time analytic engine indicates the model update message improves at least one of a detection rate of the anomalous activity and a reduction in a false positive rate, each of the one or more logical segments associating:
at least one of the first analytic model, the second analytic model, a third analytic model, a set of analytic models, and an analytic workflow,
one or more sources of inputs about activity within the logical segment, and
a set of actions for mitigating an impact of the anomalous activity occurring within the logical segment.

* * * * *